(12) United States Patent
Xue et al.

(10) Patent No.: US 11,671,967 B2
(45) Date of Patent: Jun. 6, 2023

(54) TECHNIQUES FOR CONFIGURED BEAM-SWEEPING RECEPTION FOR NEW RADIO SIDELINK

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/318,246

(22) Filed: May 12, 2021

(65) Prior Publication Data
US 2022/0369343 A1     Nov. 17, 2022

(51) Int. Cl.
*H04W 72/20* (2023.01)
*H04W 28/26* (2009.01)
*H04L 5/00* (2006.01)
*H04W 72/12* (2023.01)

(52) U.S. Cl.
CPC ......... *H04W 72/20* (2023.01); *H04L 5/0055* (2013.01); *H04W 28/26* (2013.01); *H04W 72/12* (2013.01)

(58) Field of Classification Search
CPC ....... H04B 7/02; H04L 5/0055; H04L 5/0094; H04W 28/26; H04W 72/12; H04W 72/20
See application file for complete search history.

(56) References Cited

U.S. PATENT DOCUMENTS

| | | | |
|---|---|---|---|
| 2020/0092833 A1* | 3/2020 | Agiwal | H04W 76/27 |
| 2021/0084672 A1* | 3/2021 | Gulati | H04W 72/23 |
| 2022/0361216 A1* | 11/2022 | Xue | H04W 72/0466 |

* cited by examiner

*Primary Examiner* — Khoa Huynh
(74) *Attorney, Agent, or Firm* — Dalei Dong; Holland & Hart LLP

(57) ABSTRACT

Methods, systems, and devices for wireless communications are described. In some systems, a base station may configure allocate resources for sidelink communication between a first user equipment (UE) and a second UE as part of a sidelink communication mode 1 and, in some implementations, may configure the first UE (a sidelink receiver) with a set of periodic reception occasions, each reception occasion including multiple reception opportunities for receiving sidelink control information (SCI) from the second UE (a sidelink transmitter). In some examples, each reception opportunity may be associated with a different receive beam and, as such, the first UE may monitor for the SCI from the second UE over different reception opportunities and using different receive beams. Such configured beam-sweeping reception for SCI may increase sidelink reliability as a result of greater spatial diversity, which may increase the likelihood for successful communication between the first UE and the second UE.

30 Claims, 25 Drawing Sheets

TECHNIQUES FOR CONFIGURED BEAM-SWEEPING RECEPTION FOR NEW RADIO SIDELINK

FIELD OF DISCLOSURE

The following relates to wireless communications, including techniques for configured beam-sweeping reception for New Radio (NR) sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, multiple UEs may communicate with each other via a sidelink communication channel.

SUMMARY

The present disclosure relates to improved methods, systems, devices, and apparatuses that support techniques for configured beam-sweeping reception for New Radio (NR) sidelink. For example, the present disclosure provides for resource configurations and signaling mechanisms to support lower processing and greater reception diversity for a first user equipment (UE) attempting to receive sidelink control information (SCI) from a second UE. In some implementations, for example, a base station may configure a set of periodic reception occasions and each reception occasion may include multiple reception opportunities over which the first UE may monitor for SCI from the second UE. The configuration of the set of periodic reception occasions may also specify or indicate a receive beam (e.g., a directional receive beam) that the first UE may use for each reception opportunity and, in some examples, different reception opportunities within a same reception occasion may be associated with different receive beams. As such, within a reception occasion, the first UE may monitor for the SCI from the second UE over different reception opportunities (e.g., over different sets of time and frequency resources) using different receive beams, which may reduce the amount of decoding (e.g., blind decoding) that the first UE performs to receive the SCI while also increasing a spatial diversity between the first UE and the second UE.

A method for wireless communication at first UE is described. The method may include receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, monitoring, using one or more receive beams associated with one or more reception opportunities, for the SCI over the one or more reception opportunities associated with a first reception occasion, decoding whether the SCI is present during a reception opportunity as a result of the monitoring, and communicating with the second UE in accordance with the decoding.

An apparatus for wireless communication at first UE is described. The apparatus may include a processor, memory coupled with the processor, and instructions stored in the memory. The instructions may be executable by the processor to cause the apparatus to receive, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, monitor, using one or more receive beams associated with one or more reception opportunities, for the SCI over the one or more reception opportunities associated with a first reception occasion, decode whether the SCI is present during a reception opportunity as a result of the monitoring, and communicate with the second UE in accordance with the decoding.

Another apparatus for wireless communication at first UE is described. The apparatus may include means for receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, means for monitoring, using one or more receive beams associated with one or more reception opportunities, for the SCI over the one or more reception opportunities associated with a first reception occasion, means for decoding whether the SCI is present during a reception opportunity as a result of the monitoring, and means for communicating with the second UE in accordance with the decoding.

A non-transitory computer-readable medium storing code for wireless communication at first UE is described. The code may include instructions executable by a processor to receive, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, monitor, using one or more receive beams associated with one or more reception opportunities, for the SCI over the one or more reception opportunities associated with a first reception occasion, decode whether the SCI is present during a reception opportunity as a result of the monitoring, and communicate with the second UE in accordance with the decoding.

Some examples of the method, apparatuses, and non-transitory computer-readable medium described herein may further include operations, features, means, or instructions for receiving, from the base station, a configuration of a set of multiple sidelink feedback resources that each correspond to one of the set of multiple reception opportunities associated with each reception occasion, where the configuration indicates a same quasi-colocation (QCL) source for corresponding sidelink feedback resources and reception opportunities.

In some examples of the method, apparatuses, and non-transitory computer-readable medium described herein, communicating with the second UE in accordance with the decoding may include operations, features, means, or instructions for transmitting, to the second UE using a first directional beam, feedback over a first sidelink feedback resource corresponding to the reception opportunity based on decoding whether the SCI may be present during the reception opportunity, where the reception opportunity and the first sidelink feedback resource may be both associated with a same first QCL source corresponding to the first directional beam in accordance with the configuration.

Some examples of the method, apparatuses, and non-transitory computer-readable medium described herein may further include operations, features, means, or instructions for receiving, from the base station, a configuration of a set of multiple uplink control channel resources that each correspond to one of the set of multiple reception opportunities associated with each reception occasion, where the configuration indicates, for each uplink control channel resource, whether that uplink control channel resource may be exclusively for positive acknowledgement (ACK) feedback or for either positive ACK feedback or negative ACK (NACK) feedback.

In some examples of the method, apparatuses, and non-transitory computer-readable medium described herein, the configuration indicates that each uplink control channel resource may be exclusively for positive ACK feedback.

In some examples of the method, apparatuses, and non-transitory computer-readable medium described herein, the configuration indicates that a first subset of uplink control channel resources within each reception occasion may be exclusively for positive ACK feedback and that a final uplink control channel resource within each reception occasion may be for either positive ACK feedback or NACK feedback.

In some examples of the method, apparatuses, and non-transitory computer-readable medium described herein, a supplemental uplink control channel resource for each reception occasion in addition to the set of multiple uplink control channel resources that each correspond to one of the set of multiple reception opportunities included within each reception occasion and that each uplink control channel resource of the set of multiple uplink control channel resources may be exclusively for positive ACK feedback and that the supplemental uplink control channel resource may be for either positive ACK feedback or NACK feedback.

Some examples of the method, apparatuses, and non-transitory computer-readable medium described herein may further include operations, features, means, or instructions for receiving, from the second UE, the SCI over a first reception opportunity associated with the first reception occasion, where the SCI indicates sidelink shared channel resource reservations for a remainder of the set of multiple reception opportunities associated with the first reception occasion.

Some examples of the method, apparatuses, and non-transitory computer-readable medium described herein may further include operations, features, means, or instructions for receiving, from the second UE, the SCI and sidelink data in a first reception opportunity associated with the first reception occasion, where the SCI indicates a sidelink shared channel resource reservation for a re-transmission of the sidelink data, the sidelink shared channel resource reservation outside of the first reception occasion.

In some examples of the method, apparatuses, and non-transitory computer-readable medium described herein, monitoring for the SCI may include operations, features, means, or instructions for monitoring for the SCI over a first reception opportunity during a first time period using a first receive beam and switching to monitoring for the SCI over a second reception opportunity during a second time period using a second receive beam after the first time period based on failing to decode the SCI or corresponding sidelink data over the first reception opportunity.

In some examples of the method, apparatuses, and non-transitory computer-readable medium described herein, monitoring for the SCI may include operations, features, means, or instructions for monitoring for the SCI over the first reception opportunity during a first time period using a first receive beam and refraining from monitoring for the SCI over the second reception opportunity based on successfully decoding the SCI and corresponding sidelink data over the first reception opportunity.

In some examples of the method, apparatuses, and non-transitory computer-readable medium described herein, each reception opportunity of the set of multiple reception opportunities includes a different set of time and frequency resources.

A method for wireless communication at a base station is described. The method may include transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, transmitting, to the second UE, a grant for transmitting the SCI to the first UE over at least one of the set of multiple reception opportunities associated with a first reception occasion, and communicating with one or both of the first UE or the second UE based on transmitting the indication of the set of periodic reception occasions and the grant.

An apparatus for wireless communication at a base station is described. The apparatus may include a processor, memory coupled with the processor, and instructions stored in the memory. The instructions may be executable by the processor to cause the apparatus to transmit, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, transmit, to the second UE, a grant for transmitting the SCI to the first UE over at least one of the set of multiple reception opportunities associated with a first reception occasion, and communicate with one or both of the first UE or the second UE based on transmitting the indication of the set of periodic reception occasions and the grant.

Another apparatus for wireless communication at a base station is described. The apparatus may include means for transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, means for transmitting, to the second UE, a grant for transmitting the SCI to the first UE over at least one of the set of multiple reception opportunities associated with a first reception occasion, and means for communicating with one or both of the first UE or the second UE based on transmitting the indication of the set of periodic reception occasions and the grant.

A non-transitory computer-readable medium storing code for wireless communication at a base station is described. The code may include instructions executable by a processor to transmit, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam, transmit, to the second UE, a grant for transmitting the SCI to the first UE over at least one of the set of multiple reception opportunities associated with a first reception occasion, and communicate with one or both of the first UE or the second UE based on transmitting the indication of the set of periodic reception occasions and the grant.

Some examples of the method, apparatuses, and non-transitory computer-readable medium described herein may further include operations, features, means, or instructions for transmitting, to the first UE, a configuration of a set of multiple sidelink feedback resources that each correspond to one of the set of multiple reception opportunities associated with each reception occasion, where the configuration indicates a same QCL source for corresponding sidelink feedback resources and reception opportunities.

Some examples of the method, apparatuses, and non-transitory computer-readable medium described herein may further include operations, features, means, or instructions for transmitting, to the first UE, a configuration of a set of multiple uplink control channel resources that each correspond to one of the set of multiple reception opportunities associated with each reception occasion, where the configuration indicates, for each uplink control channel resource, whether that uplink control channel resource may be exclusively for positive ACK feedback or for either positive ACK feedback or NACK feedback.

In some examples of the method, apparatuses, and non-transitory computer-readable medium described herein, the configuration indicates that each uplink control channel resource may be exclusively for positive ACK feedback.

In some examples of the method, apparatuses, and non-transitory computer-readable medium described herein, the configuration indicates that a first subset of uplink control channel resources within each reception occasion may be exclusively for positive ACK feedback and that a final uplink control channel resource within each reception occasion may be for either positive ACK feedback or NACK feedback.

In some examples of the method, apparatuses, and non-transitory computer-readable medium described herein, a supplemental uplink control channel resource for each reception occasion in addition to the set of multiple uplink control channel resources that each correspond to one of the set of multiple reception opportunities included within each reception occasion and that each uplink control channel resource of the set of multiple uplink control channel resources may be exclusively for positive ACK feedback and that the supplemental uplink control channel resource may be for either positive ACK feedback or NACK feedback.

In some examples of the method, apparatuses, and non-transitory computer-readable medium described herein, transmitting the grant to the second UE may include operations, features, means, or instructions for transmitting a single grant scheduling the second UE to transmit the SCI over a first reception opportunity associated with the first reception occasion, where the SCI indicates sidelink shared channel resource reservations for a remainder of the set of multiple reception opportunities associated with the first reception occasion.

In some examples of the method, apparatuses, and non-transitory computer-readable medium described herein, transmitting the grant to the second UE may include operations, features, means, or instructions for transmitting a plurality grants scheduling the second UE to transmit the SCI and sidelink data over the set of multiple reception opportunities associated with the first reception occasion, where the SCI indicates a sidelink shared channel resource reservation for a re-transmission of the sidelink data, the sidelink shared channel resource reservation outside of the first reception occasion.

In some examples of the method, apparatuses, and non-transitory computer-readable medium described herein, re-scheduling a resource associated with a reception opportunity for sidelink communication to a third UE, where the third UE may have a different identifier than the first UE.

In some examples of the method, apparatuses, and non-transitory computer-readable medium described herein, re-scheduling a resource associated with a reception opportunity for sidelink communication to a third UE, where the sidelink communication includes second SCI for the third UE, the second SCI associated with a lower-indexed sub-channel than the resource associated with the reception opportunity.

In some examples of the method, apparatuses, and non-transitory computer-readable medium described herein, each reception opportunity of the set of multiple reception opportunities includes a different set of time and frequency resources.

DETAILED DESCRIPTION

Figure 1:
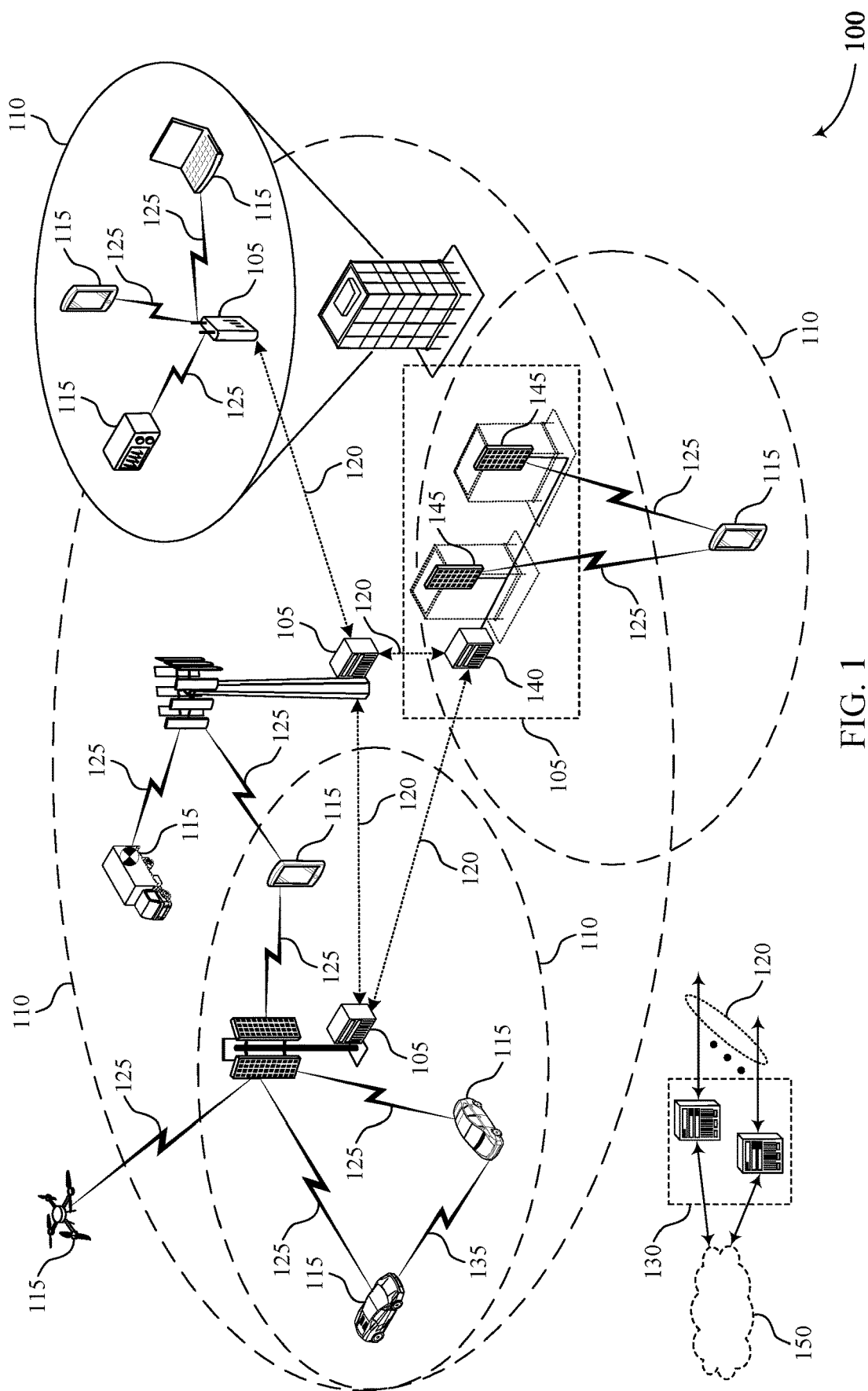
FIGS. 1 and 2 illustrate examples of wireless communications systems that supports techniques for configured beam-sweeping reception for New Radio (NR) sidelink in accordance with various aspects of the present disclosure.

In some wireless communications systems, a first user equipment (UE) may monitor for sidelink transmissions from a second UE over a set of time and frequency resources. To receive the sidelink transmission, the first UE may blind decode for sidelink control information (SCI) and may use decoded information from the SCI for receiving a data part of the sidelink transmission. Such blind decoding may result in relatively high processing or power costs at the first UE and, as such, some systems may employ a signaling mechanism to support a transmission, from a serving base station to the first UE, of an indication of the sidelink resources over which the second UE may transmit the SCI (e.g., in the case of sidelink mode 1, in which the serving base station also grants those sidelink resources to the second UE). In some cases, however, such an indication of the resources over which the second UE transmits the SCI may result in lower system flexibility (as the first UE may expect the SCI over the indicated resources and may refrain from monitoring for the SCI elsewhere) and may be deficient for some high-band operation (e.g., in systems in which beamforming is employed).

In some implementations of the present disclosure, the serving base station may configure a set of periodic reception occasions, each reception occasion including multiple reception opportunities over which the second UE may transmit the SCI, and the serving base station may transmit an indication of the set of periodic reception occasions to the first UE. Additionally, in some examples, the configuration of the set of periodic reception occasions may specify or indicate, for each reception opportunity within a reception occasion, a receive beam that the first UE may use to monitor for the SCI from the second UE. As such, within a given reception occasion, the first UE may monitor for the SCI from the second UE over configured resource allocations using a variety of receive beams. For example, within a given reception occasion, the first UE may monitor over a first reception opportunity (e.g., a first set of time and frequency resources) using a first receive beam and, if the first UE failed to decode the SCI during the first reception opportunity, may switch to monitoring over a second reception opportunity (e.g., a second set of time and frequency resources) using a second receive beam.

Various aspects of the subject matter described in this disclosure can be implemented to realize one or more of the following potential advantages. For example, the present disclosure may be implemented to reduce implementation and processing complexity (and reduce power consumption associated with such implementation and processing complexity) while supporting system flexibility and increasing reception diversity at the first UE (e.g., as a result of the configured beam-sweeping procedure). Further, the present disclosure provides various options for feedback resource configuration, which may support greater coordination between devices and facilitate greater channel knowledge and higher likelihoods for successful communication between the first UE and the second UE. Additionally, some implementations of the present disclosure provide for efficient signaling mechanisms for scheduling, allocating, or otherwise indicating the resources of each reception opportunity within a reception occasion. As such, the first UE and the second UE may experience higher data rates, greater spectral efficiency, and greater system capacity.

Aspects of the disclosure are initially described in the context of wireless communications systems. Additional aspects of the disclosure are illustrated by and described with reference to a signaling diagram, a sidelink resource allocation, a beam-sweeping procedure, and communication timelines. Aspects of the disclosure are further illustrated by and described with reference to apparatus diagrams, system diagrams, and flowcharts that relate to techniques for configured beam-sweeping reception for New Radio (NR) sidelink.

FIG. 1 illustrates an example of a wireless communications system 100 that supports techniques for configured beam-sweeping reception for NR sidelink in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, multiple UEs 115 may communicate with each other over one or more sidelink communications channels, such as a physical sidelink shared channel (PSSCH), a physical sidelink control channel (PSCCH), or a physical sidelink feedback channel (PSFCH), or any combination thereof. In some examples, a first UE 115 may attempt to receive SCI from a second UE 115 over a PSCCH and the SCI may include information that the first UE 115 may use to decode sidelink data transmitted over a PSSCH. The second UE 115 may transmit the SCI and the sidelink data to the first UE 115 in accordance with various modes or types of sidelink communication. In a sidelink communication mode 1, for example, the second UE 115 may receive a grant for the SCI and the sidelink data from a base station 105. Alternatively, in a sidelink communication mode 2, the second UE 115 may autonomously select resources over which to send the SCI and the sidelink data.

In examples in which the first UE 115 and the second UE 115 operate in accordance with the sidelink communication mode 1, the base station 105 may transmit, to the second UE 115, a grant for a set of communication resources over which the second UE 115 may transmit and may also transmit, to the first UE 115, an indication of a set of resources over which the first UE 115 may monitor for the transmission from the second UE 115. As such, the first UE 115 may monitor over (and perform blind decoding on) a relatively smaller set of resources to receive the transmission from the second UE 115, which may lower processing costs at the first UE 115.

In some implementations, the base station 105 may configure the set of resources over which the first UE 115 may monitor for the transmission from the second UE 115 in accordance with a set of periodic reception occasions, each reception occasion of the set of periodic reception occasion including multiple reception opportunities that are each associated with (e.g., configured for) different receive beams. In other words, the base station 105 may configure the first UE 115 to apply different receive beamforming over different reception opportunities. As such, the first UE 115 may leverage the lower processing costs associated with monitoring for sidelink transmissions over configured resources while achieving greater spatial diversity as a result of switching or sweeping over different receive beams during different reception opportunities, which may increase the likelihood for the first UE 115 to successfully receive the transmission from the second UE 115 (e.g., especially in high band, such as a 6 GHz or a 60 GHz frequency band, operation).

Figure 2:
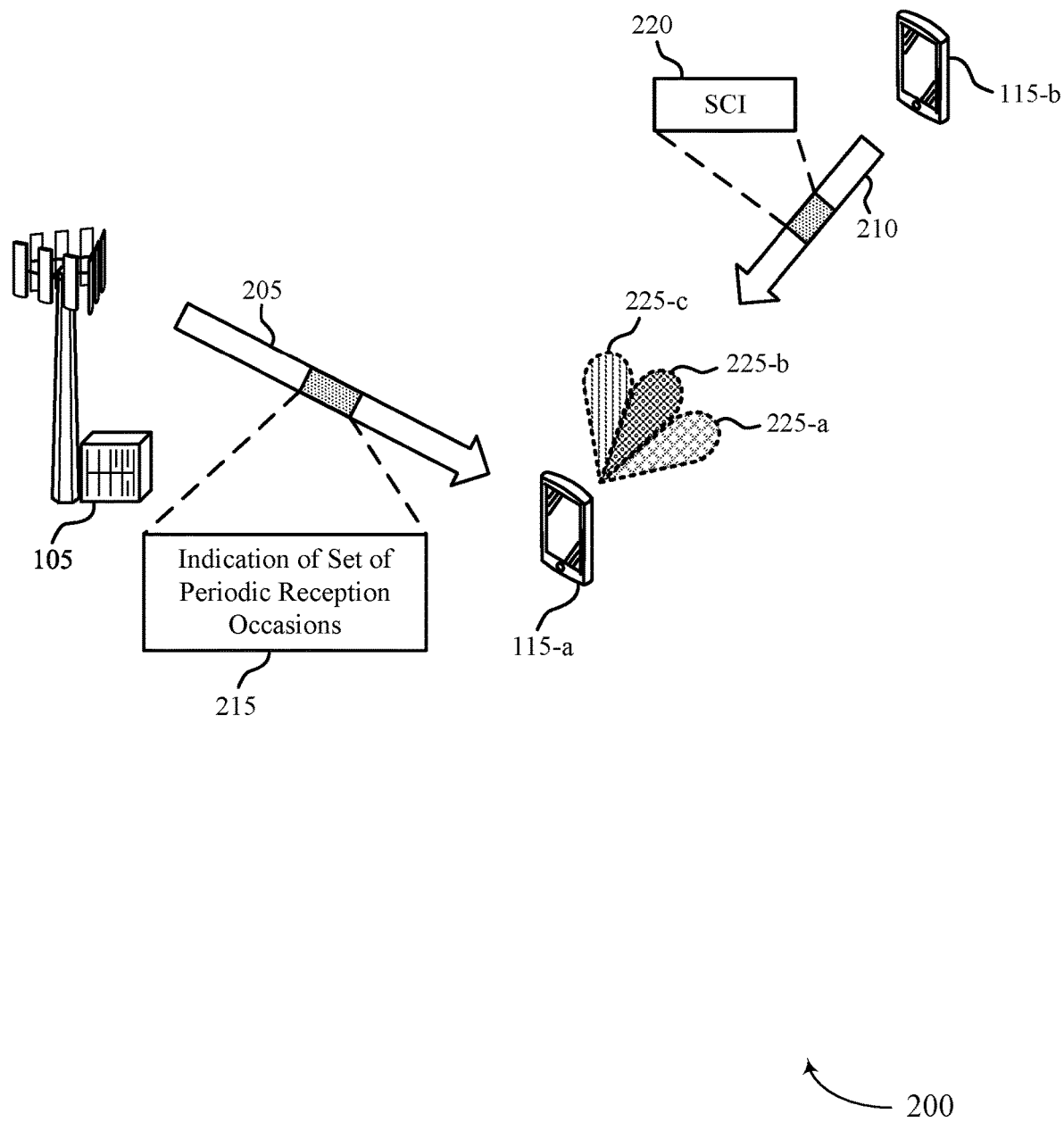

FIG. 2 illustrates an example of a wireless communications system 200 that supports techniques for configured beam-sweeping reception for NR sidelink in accordance with various aspects of the present disclosure. The wireless communications system 200 may implement aspects of the wireless communications system 100. For example, the wireless communications system 200 may include a UE 115-a, a UE 115-b, and a base station 105, which may be examples of corresponding devices described herein, including with reference to FIG. 1. In some examples, the UE 115-a may perform configured reception for a sidelink transmission over a number of reception opportunities using different receive beams 225.

For example, the UE 115-a and the UE 115-b may establish a sidelink connection and may communicate over a communication link 210 (e.g., a sidelink or a PC5 link). In some examples, the sidelink connection may feature or otherwise be in accordance with NR operation and, as such, may be referred to herein as an NR sidelink connection. Such sidelink communication may include V2X or D2D communication and, in some examples, may facilitate to the delivery of safety-related messages over a sub-6 GHz licensed band, such as an ITS band. Sidelink communication may also be extended to higher radio frequency spectrum bands.

A sidelink transmission may include SCI, such as an SCI 220, which may carry information for both intended receivers as well as other potential receivers. For example, SCI may carry or otherwise include control coding points for both the intended receivers as well as for other receivers (e.g., for channel busy ratio measurement). In other words, an intended receiver may use the received SCI to obtain information for receiving or decoding a corresponding sidelink data transmission while the other receivers may use the information from the SCI to calculate a channel busy ratio.

Sidelink communication may be configured in accordance with various modes or types. Such various modes or types of sidelink communication may relate to or refer to two different channel access or resource allocation modes. For example, a sidelink communication mode 1, which may be relevant for an in-coverage deployment, may feature operation according to which a sidelink transmitter (e.g., the UE 115-*b*) receives a grant from the base station 105 for sidelink channel access. To support a wide range of deployments, the sidelink communication mode 1 may not specify direct or tight control of the sidelink receiver (e.g., the UE 115-*a*) by the base station 105 that issues grants to the sidelink transmitter. As such, in accordance with the sidelink communication mode 1, the sidelink receiver may be served by another base station 105 or may be in a non-connected Uu/radio resource control (RRC) mode (e.g., an RRC idle mode, an RRC inactive mode, or an RRC disconnected mode).

As a result of such flexibility for the sidelink receiver to be served by another base station 105 or be in a disconnected mode, the sidelink receiver may conduct blind SCI decoding up to a capability of the sidelink receiver (e.g., because the network may be unable to indicate over which resources the SCI may be received to enable such flexibility). Such flexibility, however, may facilitate a dynamic network topology while also allowing or otherwise leaving open the possibility for direct or tight control of the sidelink receiver when such direct or tight control is possible. In some examples, direct or tight control of the sidelink receiver may be possible or likely depending on a deployment scenario of the sidelink devices, such as the radio frequency spectrum bands over which the sidelink devices communicate.

For example, not every vertical domain (e.g., time domain instance) has access to sub-6 GHz licensed bands and vertical domains having access to a sub-6 GHz licensed band may seek opportunities in other bands, such as a 60 GHz unlicensed band (e.g., a 60 GHz unlicensed band being used by IEEE 802.11ad/ay, such as FR2 or FR2x) or a new 6 GHz band (e.g., a new 6 GHz band that may be specified by the Federal Communications Commission (FCC) and the European Telecommunications Standards Institute (ETSI). Such relatively higher radio frequency spectrum bands, however, may be associated with relatively poorer coverage than that in sub-6 GHz licensed bands. For example, signaling over higher frequency carriers may experience a relatively larger path loss (e.g., may have a relatively larger path loss exponent). Further, transmitters may have stricter transmit power limits (e.g., as specified by regulation) for incumbent protection. For example, regulators may specify a very low power (VLP) mode for the 6 GHz unlicensed band, which may reduce coverage for devices transmitting according to such a relatively lower transmit power.

As such, if a mode 1-based NR sidelink system is deployed with a Uu link (e.g., the connection between the UE 115-*b* and the base station 105) over a sub-6 GHz licensed band and a PC5 link (e.g., the connection between the UE 115-*a* and the UE 115-*b*) over a relatively high-frequency unlicensed band, it is likely that both the sidelink transmitter (e.g., the UE 115-*b*) and the sidelink receiver (e.g., the UE 115-*a*) are in coverage of the same base station 105 (at least for low-rate signaling connections). Further, in such deployments, it is also likely that the sidelink transmitter and the sidelink receiver may struggle to establish a reliable or high data rate link as a result of the relatively large path loss and low coverage associated with signaling over such a relatively high-frequency unlicensed band.

To reduce the likelihood of scenarios in which the sidelink transmitter and the sidelink receiver struggle to establish a reliable or high-data rate link, some systems may implement a sidelink beamforming alignment procedure or a multi-hop network, or both. Beamforming alignment, however, may be expensive in terms of physical resources and its use may be hindered if delivering sparse or sporadic traffics, especially if at least one of the sidelink transmitter or the sidelink receiver is mobile or otherwise not fully stationary. Further, multi-hop networks may be associated with a non-trivial (i.e., high impact) development to layer 2 (L2) or layer 3 (L3), or both, protocols and set-up and maintenance of a reliable multi-hop may increase complexity and costs (e.g., especially in non-stationary use cases).

As such, in some examples, the wireless communications system 200 may implement a configured reception design such that one-hop coverage can be increased without resorting to relatively more complicated beamforming alignment or multi-hop. For example, the base station 105 may configure the sidelink receiver (e.g., the UE 115-*a*) to conduct reception and decoding of SCI (e.g., such as the SCI 220) over multiple time-frequency spots at pre-defined occasions. In some examples, such configured reception of SCI may enable the sidelink devices to set-up or establish a sidelink that may otherwise not be possible (e.g., due to coverage constraints), which may support or provide relatively higher reliability (e.g., ultra-reliability) for an NR sidelink.

Accordingly, in some implementations of the present disclosure, the base station 105 may transmit an indication of a set of periodic reception occasions 215 to the UE 115-*a* over a communication link 205 (e.g., a Uu link) and the UE 115-*a* may use the indication to identify time and frequency resources over which the UE 115-*a* may monitor for the SCI 220 from the UE 115-*b* (which may also receive a grant from the base station 105 for the transmission of the SCI 220 to the UE 115-*a* over the communication link 210). Additional details relating to such signaling between the UE 115-*a* (e.g., a sidelink receiver), the UE 115-*b* (e.g., a sidelink transmitter), and the base station 105 (e.g., a base station 105 serving both the UE 115-*a* and the UE 115-*b*) are described herein, including with reference to FIG. 3.

In some examples, the indication of the set of periodic reception occasions 215 may include or be an example of a configuration of the set of periodic reception occasions and may indicate that each reception occasion of the set of periodic reception occasions includes multiple reception opportunities over which the UE 115-*a* may monitor for the SCI 220 from the UE 115-*b*. For example, the indication of the set of periodic reception occasions 215 may specify a resource allocation for each reception occasion, a periodicity of the reception occasions, and over which resources within each reception occasion the UE 115-*a* may monitor for the SCI 220. Such resources within a reception occasion over which the UE 115-*a* may monitor for the SCI 220 may be referred to herein as reception opportunities, and such reception opportunities may be illustrated by and described in more detail with reference to FIGS. 6 through 12.

Further, the indication of the set of periodic reception occasions 215 may specify a directional beam (e.g., a receive beam 225) that the UE 115-*a* may use to monitor for the SCI 220 from the UE 115-*b* for each reception opportunity during a reception occasion. In an example, if each reception occasion includes three reception opportunities, the indication of the set of periodic reception occasions 215 may indicate that the UE 115-*a* may use a first receive beam 225-*a* to monitor for the SCI 220 over a first reception opportunity, a second receive beam 225-*b* to monitor for the SCI 220 over a second reception opportunity, and a third receive beam 225-*c* to monitor for the SCI 220 over a third reception opportunity.

In some examples, and as a result of the periodic nature of the set of reception occasions, each reception occasion of the set of periodic reception occasions may include a same quantity of reception opportunities and corresponding reception opportunities across different reception occasions may be associated with a same receive beam. For example, a first reception opportunity of a first reception occasion may be associated with the first receive beam 225-*a* and, accordingly, a first reception opportunity of a second reception occasion may be associated with the first receive beam 225-*a*. Similarly, a second reception opportunity of the first reception occasion may be associated with the second receive beam 225-*b* and, accordingly, a second reception opportunity of the second reception occasion may be associated with the second receive beam 225-*b*, and so on. As such, the UE 115-*a* may perform a same or similar beam-sweeping procedure in each of the set of periodic reception occasions that are configured by the base station 105, as illustrated by and described in more detail with reference to FIG. 6.

In some examples, the base station 105 may additionally configure resources over which the UE 115-*a* may transmit feedback associated with a successful reception (or a lack thereof) of the SCI 220 from the UE 115-*b*. In some implementations, for example, the base station 105 may transmit a configuration of a set of sidelink feedback resources, such as PSFCH resources, to the UE 115-*a* for the UE 115-*a* to use for transmitting feedback to the UE 115-*b*. Such a set sidelink feedback resources may be configured such that one sidelink feedback resource corresponds to (e.g., and immediately follows) each reception opportunity. As such, the UE 115-*a* may transmit feedback to the UE 115-*b* after each reception opportunity (if requested to by the UE 115-*b*). Such a configuration of sidelink feedback resources is illustrated by and described in more detail with reference to FIG. 8.

Additionally or alternatively, the base station 105 may transmit a configuration of a set of uplink feedback resources, such as physical uplink control channel (PUCCH) resources, to the UE 115-*a* for the UE 115-*a* to use for transmitting feedback to the base station 105. Such a set of uplink feedback resources may be configured such that one uplink feedback resource corresponds to (e.g., and immediately follows) each reception opportunity. In some examples, some of the uplink feedback resources (e.g., a first subset of uplink feedback resources in each reception occasion) may be exclusively configured for positive acknowledgement (ACK) feedback and other uplink feedback resources (e.g., a last or final uplink feedback resource in each reception occasion) may be configured for either ACK or negative ACK (NACK). Various options for the configuration of the uplink feedback resources are illustrated by and described in more detail with reference to FIG. 9.

Further, the base station 105 may allocate resources for the sidelink transmissions from the UE 115-*b* via one or multiple grants, where such grants may be either dynamic or configured. In examples in which the base station 105 transmits one grant to the UE 115-*b*, the single grant may indicate resources corresponding to one of the reception opportunities within a reception occasion. In such examples, the UE 115-*b* may transmit the SCI 220 over the resources indicated by the grant and may include, within the SCI 220, one or two PSSCH resource reservations for resources corresponding to the other one or two reception opportunities within the reception occasion. Alternatively, in examples in which the base station 105 transmits multiple grants to the UE 115-*b*, each grant may indicate resources corresponding to one of the reception opportunities within a reception occasion. In such examples, the UE 115-*b* may transmit the SCI 220 over each set of resources (and, likewise over each reception opportunity) indicated by the multiple grants. Such allocation of the resources over which the UE 115-*b* may transmit the SCI 220 to the UE 115-*a* via one or multiple grants are illustrated by and described in more detail with reference to FIGS. 10 and 11.

As such, some aspects described herein support configured reception in conjunction with beam-sweeping by the sidelink receiver within a sidelink communication mode 1, and various implementations provide for well-defined signaling mechanisms for providing feedback responsive to sidelink transmissions as well as flexibility in terms of how resources are granted to the sidelink transmitter. Accordingly, the UE 115-*a* and the UE 115-*b* may experience a greater likelihood for establishing and maintaining a reliable communication link for sidelink transmissions, even in examples in which the UE 115-*a* and the UE 115-*b* communicate over a relatively high-frequency band (e.g., such as a 6 GHz unlicensed band or a 60 GHz unlicensed band).

Figure 3:
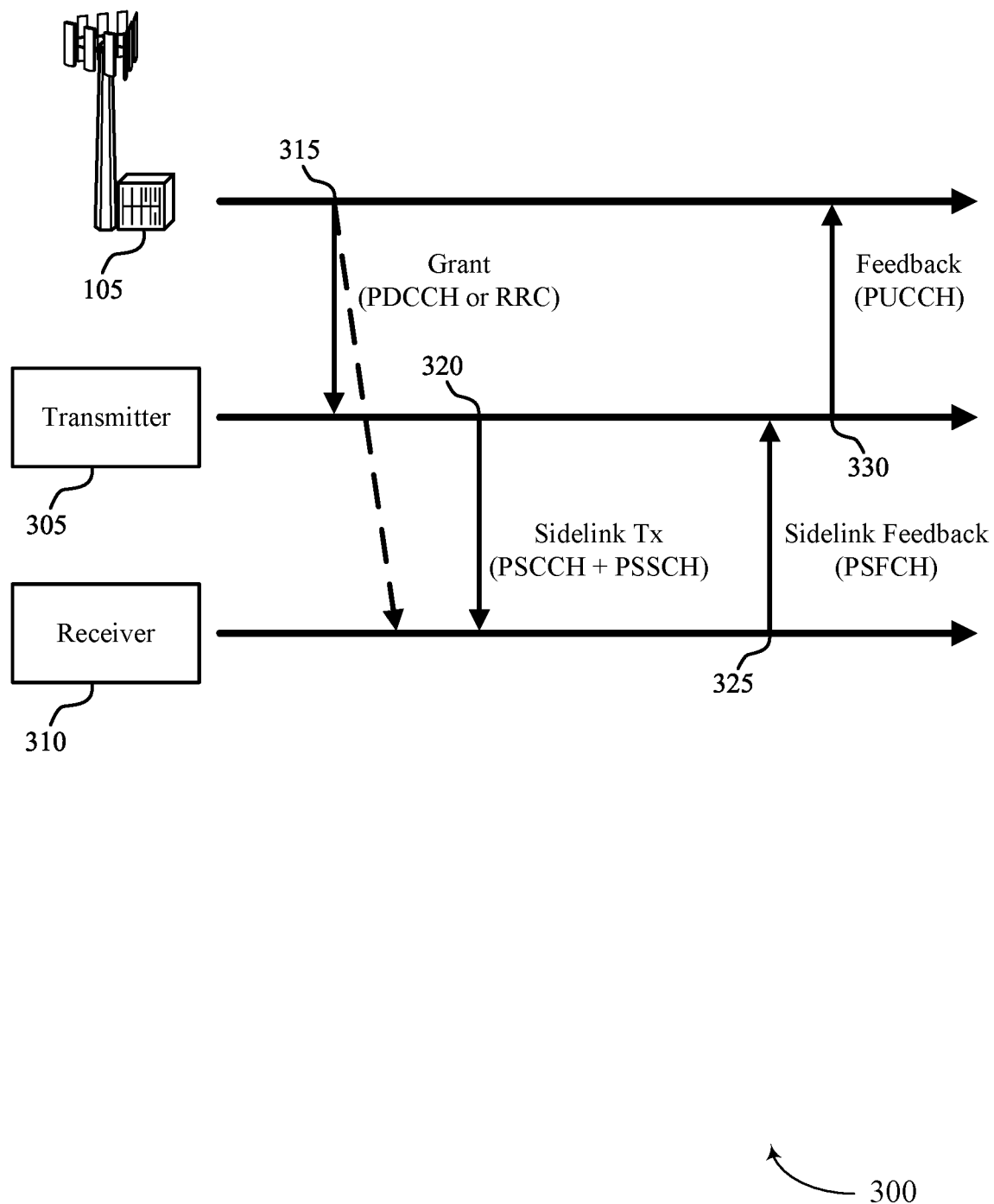
FIG. 3 illustrates an example of a signaling diagram that supports techniques for configured beam-sweeping reception for NR sidelink in accordance with various aspects of the present disclosure.

FIG. 3 illustrates an example of a signaling diagram 300 that supports techniques for configured beam-sweeping reception for NR sidelink in accordance with various aspects of the present disclosure. The signaling diagram 300 may implement or be implemented to realize aspects of the wireless communications system 100 or the wireless communications system 200. For example, the signaling diagram may illustrate communication between a base station 105, a sidelink transmitter 305, and a sidelink receiver 310, which may be examples of corresponding devices described herein, including with reference to FIGS. 1 and 2. For example, the sidelink transmitter 305 and the sidelink receiver 310 may be examples of UEs 115 (as shown in FIGS. 1 and 2). In some examples, the sidelink receiver 310 may receive an indication of a set of periodic reception occasions from the base station 105 for configured reception of sidelink transmissions in a sidelink communications mode 1.

At 315, in the sidelink communications mode 1, the sidelink transmitter 305 (e.g., an NR sidelink UE) may receive a grant for a sidelink transmission to one or more peer devices, such as the sidelink receiver 310. In some examples, the base station 105 may issue the grant for the sidelink transmission according to information that the sidelink transmitter 305 has reported (e.g., such as a sidelink buffer status) and with relatively loose (as compared to Uu scheduling) control. For example, the base station 105 may leave a determination or selection of the intended receiver up to the sidelink transmitter 305 and the sidelink transmitter 305 may select a modulation and coding scheme (MCS) to use. As such, the sidelink transmitter 305 may make such choices and insert control code points in SCI for the intended sidelink receiver (e.g., the sidelink receiver 310) accordingly. The SCI may additionally carry information to facilitate other receiving devices to conduct measurements. In some aspects, the base station 105 may transmit the grant to the sidelink transmitter as a dynamic grant or as a configured grant and, accordingly, may transmit the grant via a physical downlink control channel (PDCCH) or via RRC signaling.

In some examples, the base station 105 may additionally transmit an indication of the resources that are granted for the sidelink transmitter 305 to the sidelink receiver 310. For example, instead of having the sidelink receiver 310 perform or conduct blind SCI decoding, the base station 105 may transmit downlink control information (DCI) towards the sidelink receiver 310 to indicate the configured grant resources so that the sidelink receiver 310 is able to re-tune its attention to the granted resources (e.g., and refrain from blind decoding elsewhere). Such an indication of the configured grant resources to the sidelink receiver 310 may be suitable for some deployment scenarios, such as in industrial IoT applications (in which reducing implementation complexity and power consumption may be especially desirable). Further, in some industrial IoT applications, there may be periodic small packets between a programmable logic controller (PLC) and a UE (e.g., a standalone or S/A UE) over NR sidelink, making it natural to issue a sidelink configured grant (e.g., such as a configured grant type 2) to the sidelink transmitter 305 to carry the considered traffics.

As described herein, such an indication of the configured grant resources to the sidelink receiver 310 may reduce receiver implementation complexity as well as power consumption and, in some cases, the DCI carrying the indication of the configured grant resources may be leveraged to conduct SCI-less transmissions over sidelink (as the DCI may provide the information that sidelink receiver 310 may use to receive and decode the sidelink data transmission). In some examples, this may improve sidelink efficiency at the cost of flexibility. As such, in some implementations of the present disclosure, the base station 105 may transmit an indication of a set of periodic reception occasions to the sidelink receiver 310, each reception occasion including multiple reception opportunities that are each associated with a different receive beam.

At 320, the sidelink transmitter 305 may send the sidelink transmission to the sidelink receiver 310. The sidelink transmission (which may be denoted as a sidelink Tx) may include a PSCCH portion (carrying SCI, or at least a first portion of the SCI) and a PSSCH portion (carrying data and, in some cases, a second portion of the SCI). Additional details relating to the physical channel resources over which the sidelink transmission is sent are described herein, including with reference to FIG. 4.

At 325, the sidelink receiver 325 may transmit sidelink feedback to the sidelink transmitter 305. The sidelink receiver 325 may transmit the sidelink feedback over PSFCH resources, as also described in more detail with reference to FIG. 4. In some aspects, the transmission of the sidelink feedback from the sidelink receiver 310 to the sidelink transmitter 305 may be optional.

At 330, the sidelink transmitter 305 may transmit feedback (e.g., uplink feedback) to the base station 105. The sidelink transmitter 305 may send the feedback to the base station 105 over a PUCCH. In some examples, the sidelink transmitter 305 may transmit the feedback to the base station 105 to request resources for a re-transmission (e.g., by sending a NACK to the base station 105).

Figure 4:
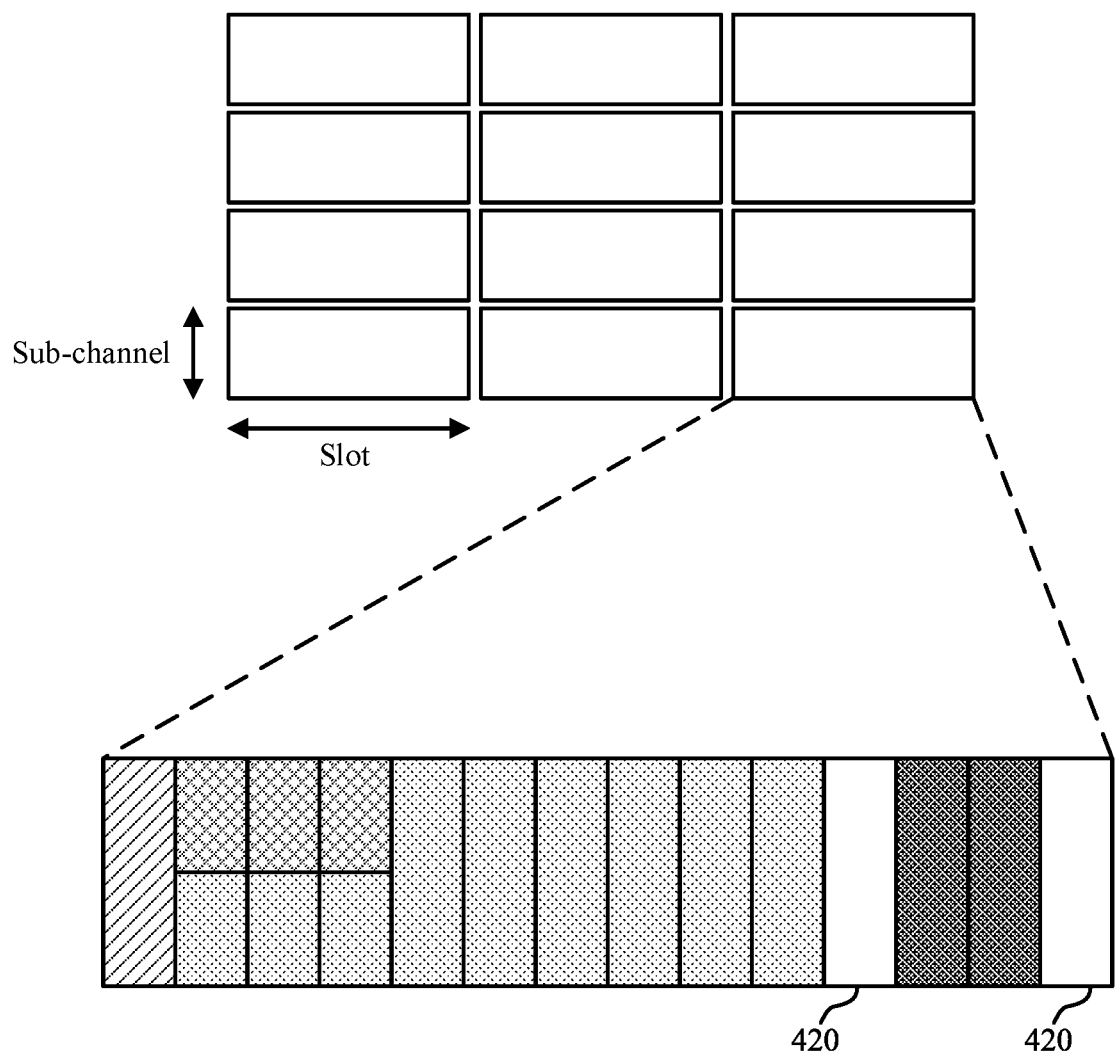
FIG. 4 illustrates an example of a sidelink resource allocation that supports techniques for configured beam-sweeping reception for NR sidelink in accordance with various aspects of the present disclosure.
Figure 4:
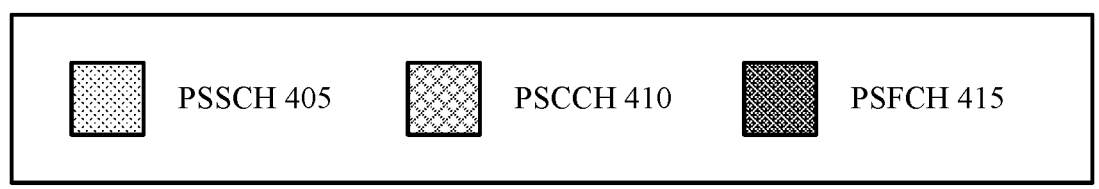

FIG. 4 illustrates an example of a sidelink resource allocation 400 that supports techniques for configured beam-sweeping reception for NR sidelink in accordance with various aspects of the present disclosure. The sidelink resource allocation 400 may implement or be implemented to realize aspects of the wireless communications system 100 or the wireless communications system 200. For example, the sidelink resource allocation 400 may illustrate a resource allocation for sidelink communication between two peer devices, such as two UEs 115 (as shown in FIGS. 1 and 2). In some examples, the configured set of periodic reception occasions that a base station 105 may indicate to a first (receiving) UE 115 may include a number of reception opportunities and each reception opportunity may include at least enough resources to carry SCI (which may be partially carried over a PSCCH 410 and partially carried over a PSSCH 405).

The sidelink resource allocation 400 may illustrate sidelink resources over one sub-channel and within one slot and may include the PSSCH 405, the PSCCH 410, a PSFCH 415, and two gap symbols 420. In some examples (such as in sidelink communications mode 1), a second (transmitting) UE 115 may receive a grant indicating the sidelink resource allocation 400 for transmission of one or more transport blocks to the first UE 115 and, accordingly, the second UE 115 may send a sidelink transmission to the first UE 115 over the sidelink resource allocation 400. The sidelink transmission may include SCI and sidelink data and, in some examples, the SCI may be split between the PSCCH 410 and the PSSCH 405. For example, a first portion of the SCI may be carried over the PSCCH 410 including enough information for the first UE 115 to identify and decode the PSSCH 405 carrying the sidelink data and a second portion of the SCI may be carried over the PSSCH 405.

In some cases, the first UE 115 may conduct blind SCI decoding up to its maximum capability, which may be suitable for V2X because a focus of V2X is for delivering safety-related messages among nearby vehicles. Such blind SCI decoding may be the foundation for a lack of tight control to the second UE 115 (e.g., the sidelink transmitter) in sidelink communications mode 1, as it provides the base station 105 with full freedom in conducting dynamic scheduling for the second UE 115. However, such flexible and dynamic scheduling may be achieved at the cost of implementation complexity and power consumption at the first UE 115 (e.g., the sidelink receiver), which may impose challenges to a non-V2X modem powered by a battery. Accordingly, there may be ample space for decoding performance improvement if some a priori information can be properly leveraged for SCI decoding.

As such, in some implementations of the present disclosure, the base station 105 may configure a number of reception opportunities (e.g., each reception opportunity corresponding to a set of time and frequency resources, such as one sub-channel and one slot) in each of a number of periodic reception occasions (e.g., a time or frequency region, or both, including or encompassing the number of reception opportunities) and the first UE 115 and the second UE 115 may communicate SCI (and potentially sidelink data) over at least a subset of the reception opportunities in each reception occasion. In some aspects, each reception opportunity may correspond to one sub-channel and one slot. In some other aspects, each reception opportunity may correspond to a frequency domain resource allocation greater than or less than one sub-channel or to a time domain resource allocation greater than or less than one slot (e.g., a subset of symbols of a slot), or any combination thereof.

For example, each reception opportunity may include a complete sidelink resource allocation 400 (e.g., each reception opportunity may include the PSSCH 405, the PSCCH 410, and the PSFCH 415) or may include a partial sidelink resource allocation 400. In examples in which each reception opportunity includes a partial sidelink resource allocation 400, each reception opportunity may include the PSSCH 405 and the PSCCH 410 (and not the PSFCH 415) or may include the PSCCH 410 (and not the PSSCH 405 or the PSFCH 415). As such, the first UE 115 may receive (or at least be able to receive) the SCI alone or the SCI and the sidelink data within a given reception opportunity.

Figure 5:
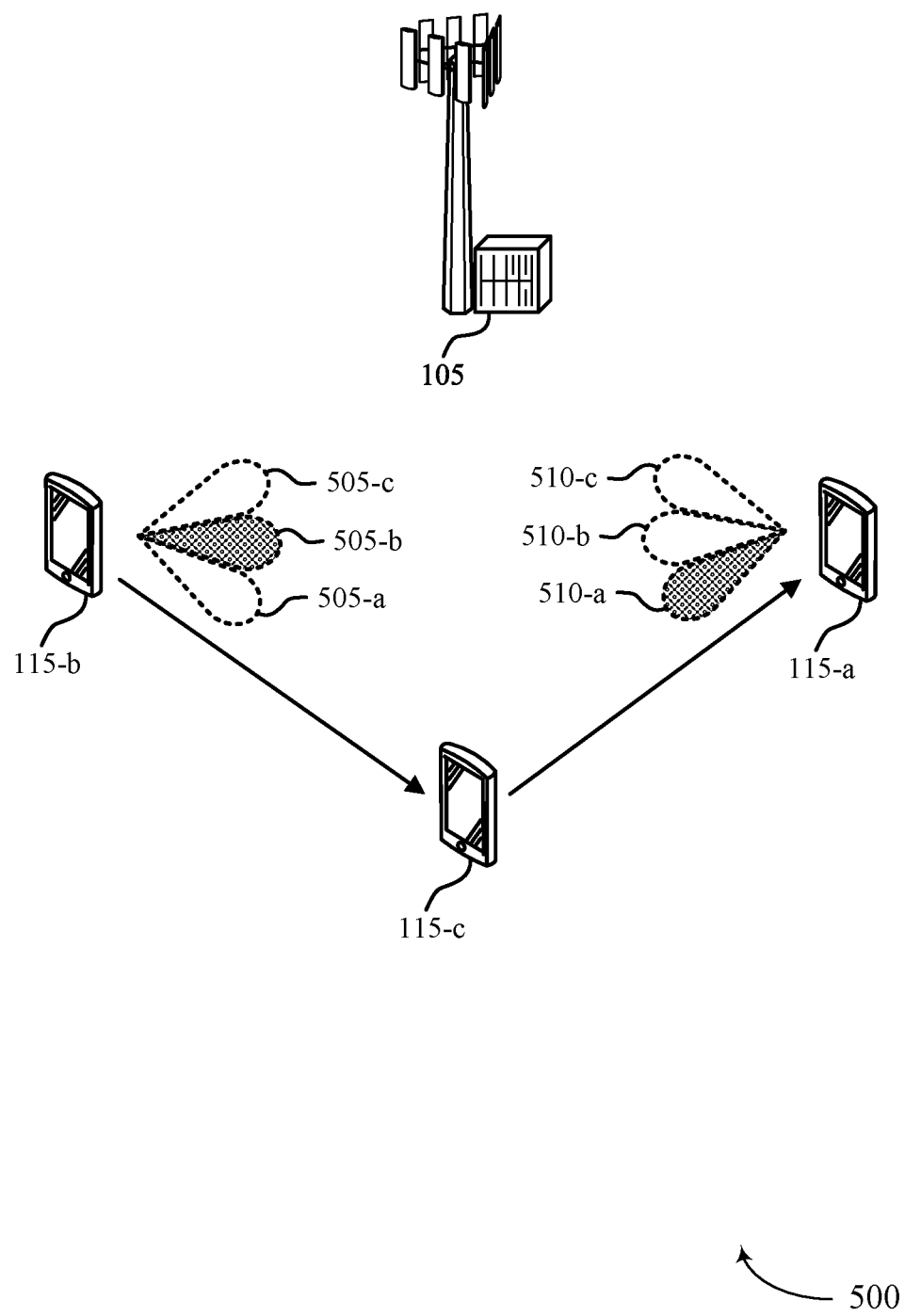
FIG. 5 illustrates an example of a beam-sweeping procedure that supports techniques for configured beam-sweeping reception for NR sidelink in accordance with various aspects of the present disclosure.

FIG. 5 illustrates an example of a beam-sweeping procedure 500 that supports techniques for configured beam-sweeping reception for NR sidelink in accordance with various aspects of the present disclosure. The beam-sweeping procedure 500 may implement or be implemented to realize aspects of the wireless communications system 100 or the wireless communications system 200. For example, a UE 115-a and a UE 115-b may employ the beam-sweeping procedure 500 if communicating in accordance with a configured set of periodic sidelink reception occasions (e.g., as configured by a base station 105 serving both the UE 115-a and the UE 115-b), each reception occasion including multiple reception opportunities that are each associated with, configured for, or otherwise allow for different directional beamforming.

For example, in implementations in which each configured reception occasion includes three reception opportunities, the UE 115-b (e.g., a sidelink transmitter) may transmit SCI (and possibly also sidelink data) over at least a subset of the three reception opportunities and the UE 115-a (e.g., a sidelink receiver) may monitor for the SCI over at least a subset of the three reception opportunities. As described herein, each reception opportunity within a given reception occasion may be associated with a different receive beam 510 that the UE 115-a may use for the monitoring and, in some examples, the UE 115-b may also switch between transmit beams 505 over the various reception opportunities (which may be understood as transmission opportunities from the perspective of the UE 115-a) when transmitting the SCI to the UE 115-a.

As such, the UE 115-a may use a different receive beam 510 for each reception opportunity within a given reception occasion and the UE 115-b may either use a same transmit beam 505 or may use different transmit beams 510 for each SCI transmission (or a combination thereof, such that some SCI transmissions may use a same transmit beam 505 while some others may use a different transmit beam 505). As shown in FIG. 5 for the case of three reception opportunities within each reception occasion, the UE 115-b may potentially cycle between a transmit beam 505-a, a transmit beam 505-b, and a transmit beam 505-c and the UE 115-a may cycle between a receive beam 510-a, a receive beam 510-b, and a receive beam 510-c. In examples in which both the UE 115-a and the UE 115-b perform the beam-sweeping procedure 500 for communicating SCI (and possibly sidelink data), the UE 115-a and the UE 115-b may experience a greater likelihood for establishing a more reliable communication link as a result of trying a variety of beam-pairs.

In some cases, the proposed receive beam-sweeping over multiple reception opportunities during each of a number of periodic reception occasions may be useful if an effective traffic duty cycle is longer than a "coherent" time of beamforming alignment or multi-hop routing over a sidelink. For example, if the UE 115-b is transmitting periodic traffic to the UE 115-a with a relatively long duty cycle T, there may be use cases or deployment scenarios in which either the UE 115-a or the UE 115-b cannot be kept fully stationary (e.g., becomes mobile) during the interval T. In such use cases or deployment scenarios, the UE 115-a and the UE 115-b may be unable to maintain fully aligned beamforming (such that the UE 115-a and the UE 115-b may end up using directional beams that do not point directly towards each other, which may result in a higher likelihood for communication failures). Similarly, a multi-hop network established with a mobile relaying UE 115-c at a time t may break (e.g., the relay link may collapse or no longer function as originally intended) at instant t+T, which may also result in a higher likelihood for communication failures. This may be especially problematic if Uu links to the serving base station 105 are incapable of carrying the triangulated data traffic between the UE 115-a and the UE 115-b (e.g., the data traffic relayed by the UE 115-c).

Figure 6:
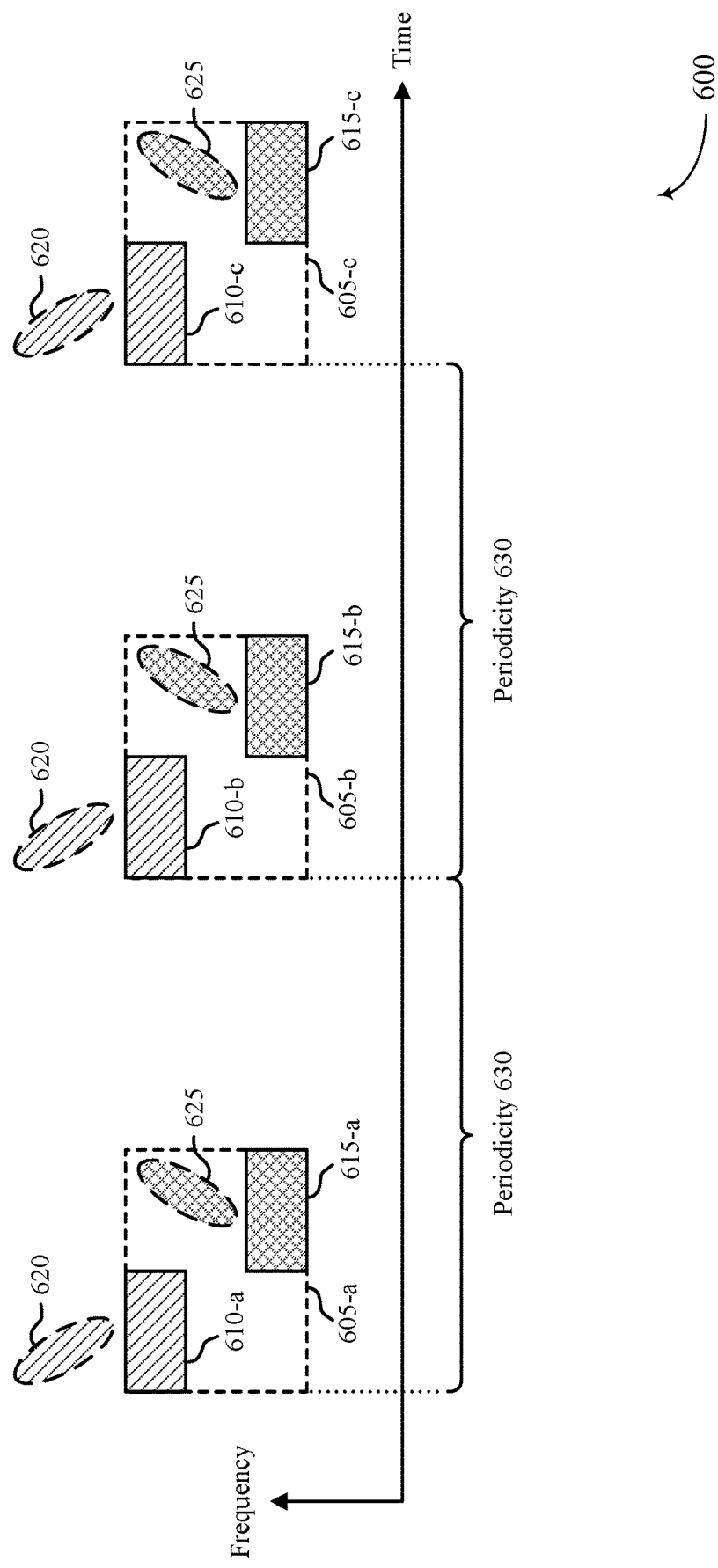
FIGS. 6 through 12 illustrate examples of communication timelines that support techniques for configured beam-sweeping reception for NR sidelink in accordance with various aspects of the present disclosure.

FIG. 6 illustrates an example of a communication timeline 600 that supports techniques for configured beam-sweeping reception for NR sidelink in accordance with various aspects of the present disclosure. The communication timeline 600 may implement or be implemented to realize aspects of the wireless communications system 100 or the wireless communications system 200. For example, the communication timeline 600 may illustrate communication between a first UE 115 (e.g., a sidelink receiver) and a second UE 115 (e.g., a sidelink transmitter) over a configured set of reception opportunities within each of a set of periodic reception occasions 605.

In some implementations, a serving base station 105 may configure the first UE 115 to conduct configured (i.e., over a pre-specified time-frequency resource and with specified processing configuration) reception to search for SCIs that may otherwise be missed by the first UE 115. For example, the first UE 115 may receive, from the base station 105, an indication of a set of periodic reception occasions 605, each reception occasion 605 including multiple reception opportunities over which the first UE 115 may monitor for SCI. In some examples, and as shown in FIG. 6, each reception occasion 605 may include two reception opportunities (e.g., a reception opportunity 610 and a reception opportunity 615) and may be configured according to a periodicity 630.

The base station 105 may transmit the configuration of the periodic configured reception (e.g., the indication of the set of periodic reception occasions 605 and, in some examples, the number of reception opportunities per reception occasion 605) via RRC signaling (which may be referred to herein as a Type 1 configuration) or via RRC signaling plus DCI (which may be referred to herein as a Type 2 configuration). In some examples, each of the multiple reception opportunities within each reception occasion 605 may occupy a sub-channel and a set of time domain resources (e.g., a number of symbols or slots) and may be configured with different receive beams (e.g., with different quasi-colocation (QCL) sources) to configure or otherwise enable the first UE 115 to conduct beam-sweeping reception. In other words, for example, the first UE 115 may be configured to apply different receive beamforming over different reception opportunities within a given reception occasion 605.

For example, the first UE 115 may the receive the configuration of the periodic configured reception and may identify a reception occasion 605-a, a reception occasion 605-b, and a reception occasion 605-c, each including a reception opportunity 610 associated with a receive beam 620 and a reception opportunity 615 associated with a receive beam 625. As such, within the reception occasion 605-a, the first UE 115 may monitor for SCI from the second UE 115 using the receive beam 620 over a reception opportunity 610-a and, in some examples (e.g., if the first UE 115 fails to successfully receive the SCI and, in some examples, the corresponding sidelink data over the reception opportunity 610-a), may switch to monitoring for the SCI using the receive beam 625 over a reception opportunity 615-a.

Similarly, within the reception occasion 605-b, the first UE 115 may monitor for SCI from the second UE 115 using the receive beam 620 over a reception opportunity 610-b and, in some examples (e.g., if the first UE 115 fails to successfully receive the SCI and, in some examples, the corresponding sidelink data over the reception opportunity 610-b), may switch to monitoring for the SCI using the receive beam 625 over a reception opportunity 615-b. Likewise, within the reception occasion 605-c, the first UE 115 may monitor for SCI from the second UE 115 using the receive beam 620 over a reception opportunity 610-c and, in some examples (e.g., if the first UE 115 fails to successfully receive the SCI and, in some examples, the corresponding sidelink data over the reception opportunity 610-c), may switch to monitoring for the SCI using the receive beam 625 over a reception opportunity 615-*c*.

If the first UE 115 successfully decodes SCI in one of the reception opportunity 610 or the reception opportunity 615, the first UE 115 may follow an indication or information provided therein (e.g., included in a received and decoded SCI) to decode the sidelink data in PSSCH(s) and, in some examples, to identify resources for PSFCH feedback. Additional details relating to signaling mechanisms according to which the first UE 115 may transmit PSFCH feedback are described in more detail herein, including with reference to FIG. 8. Further, in some examples, the first UE 115 may receive a configuration for PUCCH resources to report a HARQ response (e.g., PUCCH ACK/NACK) to the base station 105, as described in more detail herein, including with reference to FIG. 9. Further, although shown as including two reception opportunities in FIG. 6, a reception occasion 605 may include any number of reception opportunities without exceeding the scope of the present disclosure.

In accordance with the described configured beam-sweeping reception, the first UE 115 may assign one sidelink process for each reception opportunity and may process each reception opportunity one-by-one. As such, the first UE 115 may attempt to decode SCI in each reception opportunity and, if no valid SCI is decoded or detected within a first reception opportunity, the first UE 115 may switch to monitoring over another reception opportunity until either a valid SCI is decoded or until the reception occasion ends. As described in more detail herein, including with reference to FIG. 7, the first UE 115 may support early termination or deep-inspection upon decoding of a valid SCI, which may result in more resources being available for the system or fewer "false alarm" errors at the first UE 115.

Figure 7:
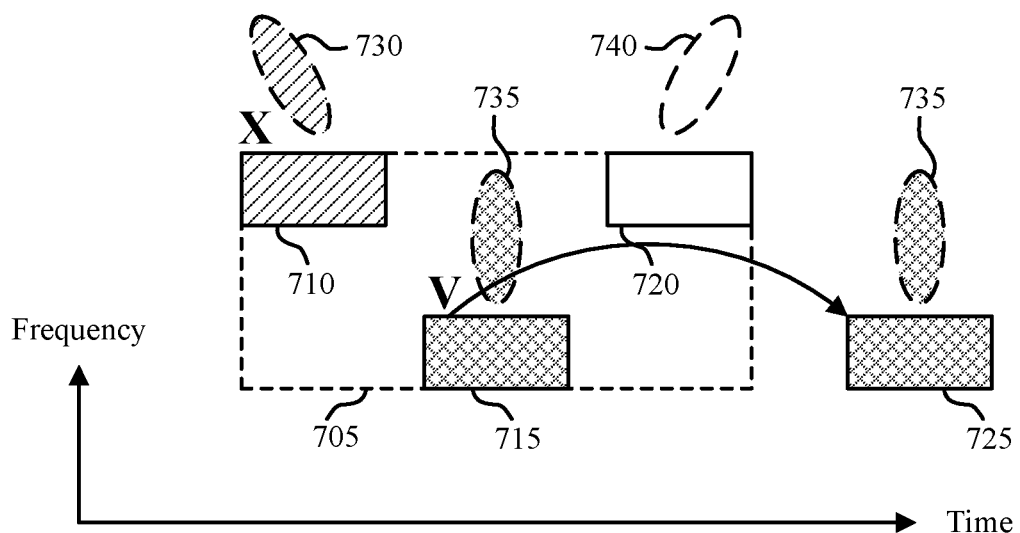

FIG. 7 illustrates an example of a communication timeline 700 that supports techniques for configured beam-sweeping reception for NR sidelink in accordance with various aspects of the present disclosure. The communication timeline 700 may implement or be implemented to realize aspects of the wireless communications system 100 or the wireless communications system 200. For example, the communication timeline 700 may illustrate communication between a first UE 115 (e.g., a sidelink receiver) and a second UE 115 (e.g., a sidelink transmitter) over a configured set of reception opportunities within each of a set of periodic reception occasions 705.

For example, the first UE 115 may receive an indication of the set of periodic reception occasions 705 from a base station 105 and may attempt to search for a valid SCI over reach reception opportunity within a given reception occasion 705 (e.g., where a valid SCI may refer to an SCI that passes a cyclic redundancy check (CRC), meaning that the first UE 115 is the correct destination for that SCI). In examples in which the first UE 115 decodes a valid SCI, the first UE 115 may decode the same-slot PSSCH as indicated by the SCI and, in some implementations, may early terminate the configured beam-sweeping reception for the current reception occasion 705. For example, if the first UE 115 successfully decodes the same-slot PSSCH as indicated by the valid SCI, the first UE 115 may perform an early termination of the monitoring during the reception occasion 705 (i.e., may give up or release the resources associated with any remaining, later reception opportunities within the reception occasion 705). Alternatively, in examples in which the first UE 115 successfully receives and decodes a valid SCI in a reception opportunity, the first UE 115 may still, in some examples, fail to decode the same-slot PSSCH. In such examples in which the first UE 115 fails to decode the same-slot PSSCH, the first UE 115 may be configured to decode a set of reserved PSSCH resources that may be indicated by the SCI.

For instance, and as shown in FIG. 7, the reception occasion 705 (which may correspond to any one of the set of periodic reception occasions 705) may include a reception opportunity 710 associated with a receive beam 730, a reception opportunity 715 associated with a receive beam 735, and a reception opportunity 720 associated with a receive beam 740 and, in some examples, the first UE 115 may fail to decode a valid SCI during the reception opportunity 710 but may decode a valid SCI during the reception opportunity 715. As such, the first UE 115 may attempt to decode a same-slot PSSCH indicated by the SCI that is decoded during the reception opportunity 715 and, if the decoding the same-slot PSSCH is unsuccessful, the first UE 115 may attempt to decode sidelink data transmitted over a PSSCH resource 725 reserved by the valid SCI. In some examples, the first UE 115 may use the same receive beam 735 to receive the sidelink data over the PSSCH resource 725 that the first UE 115 uses to monitor for the SCI reserving the PSSCH resource 725.

If the first UE 115 fails to decode a valid SCI over a given reception opportunity within the reception occasion 705 (e.g., such as over the reception opportunity 710), the first UE 115 may re-attempt SCI decoding on the next reception opportunity (e.g., the reception opportunity 715) until the last reception opportunity in the reception occasion 705. As described herein, the first UE 115 may, in some examples, opt for an early termination of the SCI decoding after detecting a valid SCI. In some cases, however, SCI may carry 16 bits of the 24 bits L2 UE ID, which may result in the possibility for a "false alarm" at the first UE 115 (e.g., if two UEs 115 have UE IDs having a same 16-bit representation in SCI but different 24-bit UE IDs).

As such, to support ultra-reliability over an NR sidelink, the first UE 115 may be further configured by the base station 105 to conduct deep inspection before fully locking into a valid SCI. For example, if the first UE 115 identifies a valid SCI but fails to decode a corresponding PSSCH to have the correct 24-bit L2 ID (e.g., the 24-bit L2 ID associated with the first UE 115), the first UE 115 may continuously sweep over any number of remaining reception opportunities during the reception occasion 705 to avoid the false-alarm case. As such, in examples in which the first UE 115 successfully decodes a valid SCI over the reception opportunity 715 and decodes the correct 24-bit L2 ID in the corresponding PSSCH, the first UE 115 may implement early termination and release the resources associated with any remaining reception opportunities. In other words, the first UE 115 may release the resources associated with the reception opportunity 720 and may refrain from attempting to decode a valid SCI over the reception opportunity 720. Alternatively, if the first UE 115 fails to successfully decode the correct 24-bit L2 ID in the PSSCH corresponding to the valid SCI decoded over the reception opportunity 715, the first UE 115 may continue to search for and attempt to decode a valid SCI in any remaining reception opportunities during the reception occasion 705. In other words, the first UE 115 may attempt to decode another valid SCI over the reception opportunity 720.

Upon either successful or unsuccessful decoding, the first UE 115 may be configured to report feedback to one or both of the second UE 115 or the serving base station 105. Additional details relating to sidelink feedback reporting (e.g., to the second UE 115) are described with reference to FIG. 8 and additional details relating to uplink feedback reporting (e.g., to the serving base station 105) are described with reference to FIG. 9.

Figure 8:
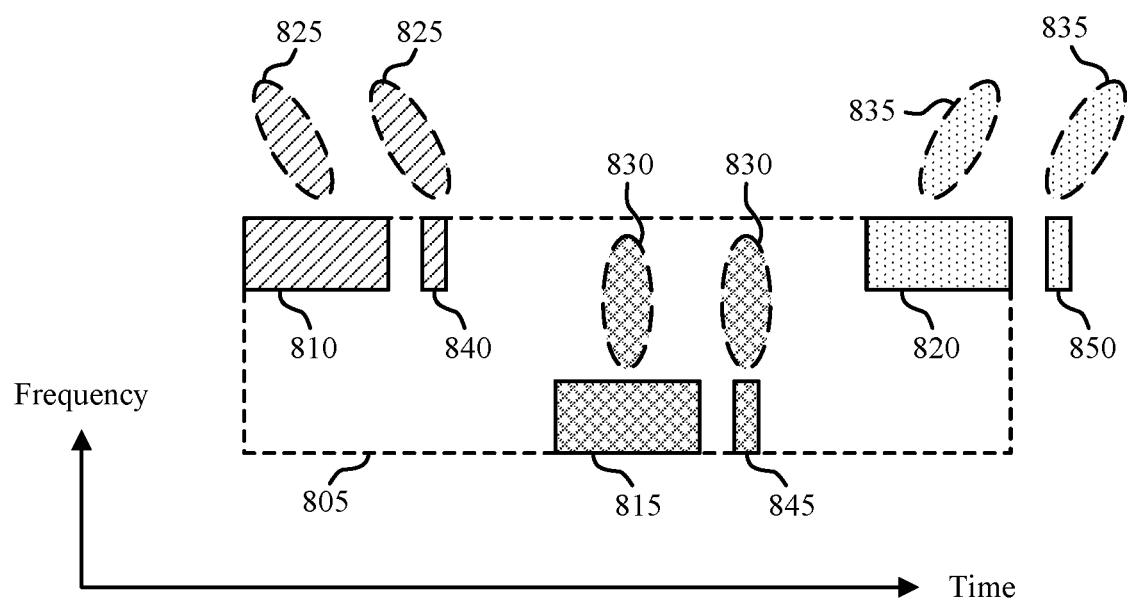

FIG. 8 illustrates an example of a communication timeline 800 that supports techniques for configured beam-sweeping reception for NR sidelink in accordance with various aspects of the present disclosure. The communication timeline 800 may implement or be implemented to realize aspects of the wireless communications system 100 or the wireless communications system 200. For example, the communication timeline 800 may illustrate communication between a first UE 115 (e.g., a sidelink receiver) and a second UE 115 (e.g., a sidelink transmitter) over a configured set of reception opportunities within each of a set of periodic reception occasions 805.

In some examples, the first UE 115 may receive a configuration of a set of sidelink feedback resources (e.g., PSFCH resources) over which the first UE 115 may transmit feedback to the second UE 115. The first UE 115 may receive the configuration of the sidelink feedback resources from the base station 105 or from the second UE 115. In some examples, the configured set of sidelink feedback resources may include a sidelink feedback resource corresponding to each reception opportunity within a reception occasion 805. For example, the reception occasion 805 may include a reception opportunity 810, a reception opportunity 815, and a reception opportunity 820 and each of the reception opportunities may be associated with (e.g., via the configuration of the sidelink feedback resources) a different sidelink feedback resource. As shown in FIG. 8, for example, the reception opportunity 810 may be associated with a sidelink feedback resource 840, the reception opportunity 815 may be associated with a sidelink feedback resource 845, and the reception opportunity 820 may be associated with a sidelink feedback resource 850.

As such, the first UE 115 may report feedback to the second UE 115 indicating whether a valid SCI was successfully received over the reception opportunity 810 over the sidelink feedback resource 840, may report feedback to the second UE 115 indicating whether a valid SCI was successfully received over the reception opportunity 815 over the sidelink feedback resource 845, and may report feedback to the second UE 115 indicating whether a valid SCI was successfully received over the reception opportunity 820 over the sidelink feedback resource 850. In some examples, the first UE 115 may transmit feedback over one or more of such configured sidelink feedback resources per, according to, or as a result of receiving a request for the feedback from the second UE 115.

In some implementations, the sidelink feedback resources may be configured to set a same QCL source to a sidelink feedback transmission as that of the corresponding reception opportunity. For example, the configuration of the sidelink feedback resources may indicate that the reception opportunity 810 and the sidelink feedback resource 840 are associated with a same QCL source and, likewise, may be associated with a same directional beam 825. Similarly, the configuration of the sidelink feedback resources may indicate that the reception opportunity 815 and the sidelink feedback resource 845 are associated with a same QCL source and, likewise, may be associated with a same directional beam 830 and that the reception opportunity 820 and the sidelink feedback resource 850 are associated with a same QCL source and, likewise, may be associated with a same directional beam 835. As such, for a given reception opportunity, the first UE 115 may monitor for a valid SCI using a receive beam corresponding to the associated directional beam and may transmit sidelink feedback using a transmit beam corresponding to the same associated directional beam.

Figure 9:
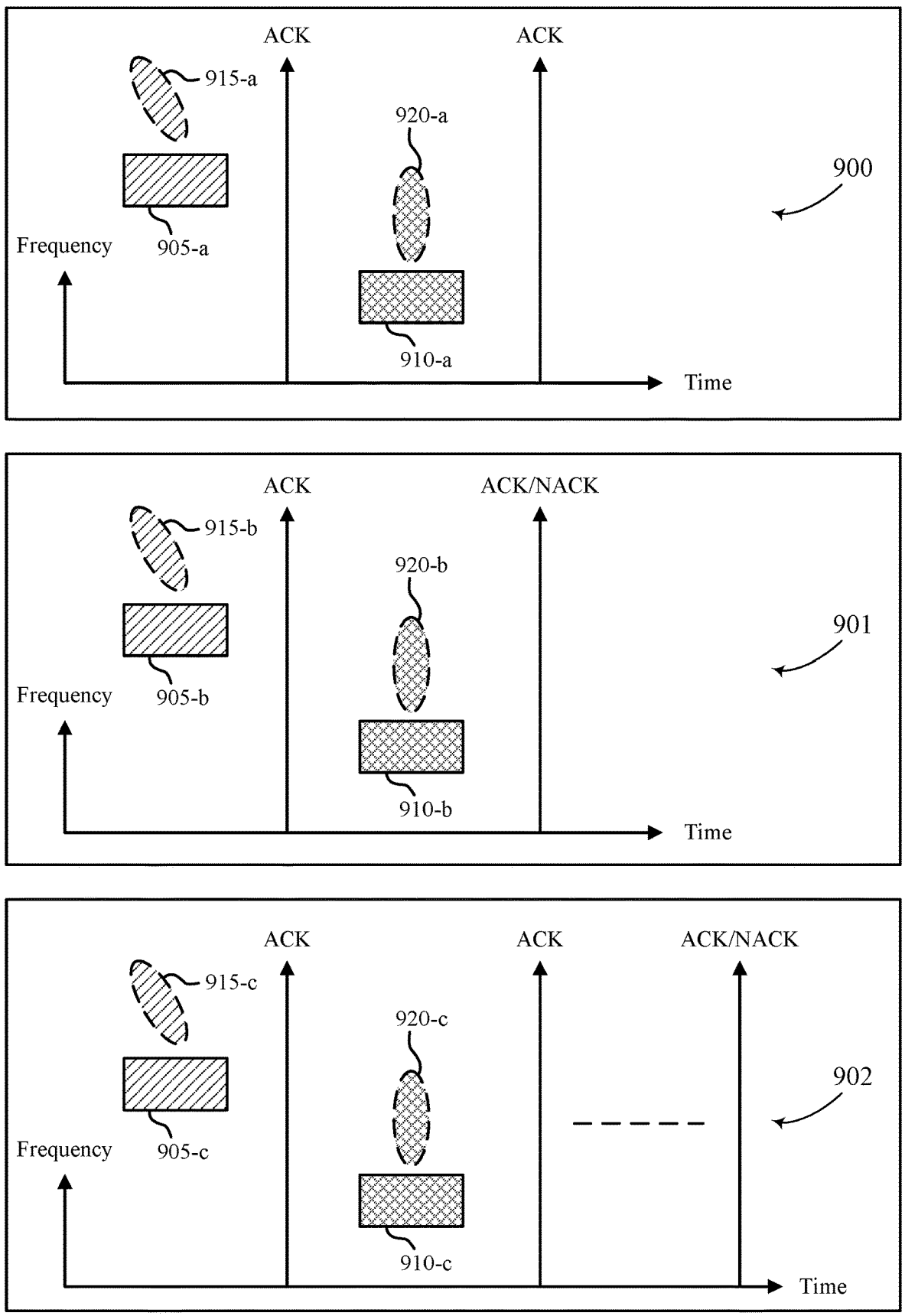

FIG. 9 illustrates examples of a communication timeline 900, a communication timeline 901, and a communication timeline 902 that support techniques for configured beam-sweeping reception for NR sidelink in accordance with various aspects of the present disclosure. The communication timeline 900, the communication timeline 901, and the communication timeline 902 may implement or be implemented to realize aspects of the wireless communications system 100 or the wireless communications system 200. For example, the communication timeline 900, the communication timeline 901, and the communication timeline 902 may illustrate communication between a first UE 115 (e.g., a sidelink receiver) and a second UE 115 (e.g., a sidelink transmitter) over a configured set of reception opportunities within each of a set of periodic reception occasions and may also illustrate feedback communication between the first UE 115 and a serving base station 105.

In some examples, the first UE 115 may receive a configuration of a set of uplink feedback resources (e.g., PUCCH resources) over which the first UE 115 may transmit feedback to the base station 105. The first UE 115 may receive the configuration of the uplink feedback resources from the base station 105 or from the second UE 115. The set of uplink feedback resources may be configured according to various options or ways, as shown in FIG. 9 and described herein. For example, in a first option, the first UE 115 may receive a configuration of no uplink feedback resources or may not receive a configuration of uplink feedback resources. In such examples, the first UE 115 may refrain from transmitting feedback to the base station 105 as a result of not having any configured uplink feedback resources.

In a second option, and as illustrated by the communication timeline 900, the first UE 115 may receive a configuration of an ACK-only resource after each reception opportunity. In such examples, the first UE 115 may report an ACK to the base station 105 if the first UE 115 correctly decodes a valid SCI and a same-slot PSSCH. For example, the first UE 115 may have a reception opportunity 905-a associated with a receive beam 915-a and a reception opportunity 910-a associated with a receive beam 920-a (which both may be within a same reception occasion) and the first UE 115 may be configured with resources over which to transmit an ACK to the base station 105 for each of the reception opportunity 905-a and the reception opportunity 910-a. In examples in which the first UE 115 successfully decodes a valid SCI and a same-slot PSSCH in an earlier reception opportunity (e.g., the reception opportunity 905-a), the first UE 115 may perform early termination and may release resources for any later reception opportunities within the same reception occasion (e.g., the reception opportunity 910-a) as well as the resources configured for uplink feedback corresponding to any such later reception opportunities.

In a third option, and as illustrated by the communication timeline 901, the first UE 115 may receive a configuration of ACK-only resources for earlier reception opportunities (e.g., a first subset of reception opportunities) and a configuration of an ACK/NACK resource for a last or final reception opportunity within the reception occasion. As such, the first UE 115 may exclusively or only transmit ACK (if decoding is successful) for an initial subset of reception opportunities but may transmit either an ACK or a NACK (depending on whether decoding is successful) for a final reception opportunity. For example, the first UE 115 may have a reception opportunity 905-b associated with a receive beam 915-b and a reception opportunity 910-b associated with a receive beam 920-b (which both may be within a same reception occasion) and the first UE 115 may be configured with resources over which to transmit an ACK to the base station 105 for the reception opportunity 905-b (which may belong to an initial subset of reception opportunities) but may be configured with resources over which to transmit either an ACK or a NACK to the base station 105 for the reception opportunity 910-b (e.g., a final reception opportunity within the reception occasion).

In a fourth option, and as illustrated by the communication timeline 902, the first UE 115 may receive a configuration of an ACK-only resource after each reception opportunity and a configuration of a supplemental or late or final ACK/NACK resource that is detached from (e.g., not specifically associated with) any reception opportunity. In other words, for example, such a supplemental ACK/NACK resource may be associated with the reception occasion such that the first UE 115 may report an ACK if a valid SCI and a same-slot PSSCH are decoded in any reception opportunity within the reception occasion or may report a NACK if a valid SCI and a same-slot PSSCH are not decoded in any reception opportunity within the reception occasion. In some examples, the supplemental (e.g., late or final) ACK/NACK resource may be located after any potential re-transmissions (e.g., to avoid unnecessary re-transmissions if a re-transmission over a reserved PSSCH resource is received correctly). For example, the first UE 115 may have a reception opportunity 905-c associated with a receive beam 915-c and a reception opportunity 910-c associated with a receive beam 920-c (which both may be within a same reception occasion) and the first UE 115 may be configured with resources over which to transmit an ACK to the base station 105 for each of the reception opportunity 905-c and the reception opportunity 910-c as well as with a relatively later (in time) resource over which to transmit either an ACK or a NACK depending on whether a PSSCH is successfully received in that reception occasion.

In some implementations, the first UE 115 may receive a configuration (e.g., via L3 or layer 1 (L1) signaling) of a single one of the various options for the uplink feedback resources. Alternatively, in some other implementations, the first UE 115 may receive a configuration (e.g., via L3 or L1 signaling) of multiple of the various options for the uplink feedback resources and may additionally receive activation or re-activation signaling (e.g., via L1 signaling) to use one of the multiple configured options. For example, the first UE 115 may be configured via RRC signaling with multiple (e.g., all) PUCCH resource configurations and to receive an indication in SCI indicating which option is to be applied in a given reception occasion. This may enable the base station 105 to increase system flexibility and reliability, as the base station 105 may activate Uu feedback if the base station 105 finds that PSFCH feedback is not being (or cannot be) reliably received for some reason (e.g., such as a reception or transmission conflict at the sidelink transmitter). In such examples in which the base station 105 activates, de-activates, or re-activates one of multiple configured options for PUCCH resources, the base station 105 may send an indication (e.g., via L3, L2, or L1 signaling) to the sidelink transmitter (e.g., the second UE 115) to carry an indication of the activation, the de-activation, or the re-activation via one or more bits in SCI.

Additionally or alternatively, the base station 105 may transmit one or more grants to the second UE 115 to allocate resources for the second UE 115 to use for transmitting to the first UE 115. Such grants may be either dynamic or configured and the second UE 115 may send a transport block towards one or more resource allocations (e.g., which may cover the same resources as one or more reception opportunities) in accordance with whether the base station 105 transmits one grant or transmits multiple grants. Additional details relating to a transmission of a single grant are described with reference to FIG. 10 and additional details relating to a transmission of multiple grants are described with reference to FIG. 11.

Figure 10:
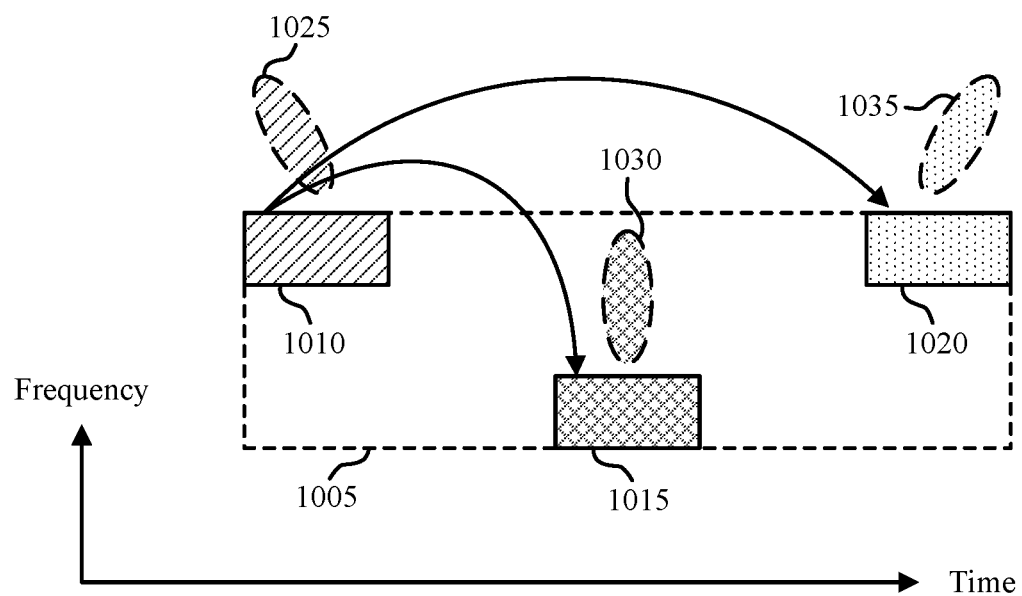

FIG. 10 illustrates an example of a communication timeline 1000 that supports techniques for configured beam-sweeping reception for NR sidelink in accordance with various aspects of the present disclosure. The communication timeline 1000 may implement or be implemented to realize aspects of the wireless communications system 100 or the wireless communications system 200. For example, the communication timeline 1000 may illustrate communication between a first UE 115 (e.g., a sidelink receiver) and a second UE 115 (e.g., a sidelink transmitter) over a configured set of reception opportunities within each of a set of periodic reception occasions 1005.

In some examples, a serving base station 105 may issue one grant, either dynamic or configured, to the second UE 115 to send a transport block towards one configured reception occasion 1005. The single grant may provide resources corresponding to a first reception opportunity (e.g., a reception opportunity 1010 associated with a receive beam 1025) and the second UE 115 may include an indication of up to two PSSCH reservations within the SCI that the second UE 115 transmits over the first reception opportunity. As such, the second UE 115 may effectively reserve resources for one or two additional SCI and PSSCH transmissions to the first UE 115 and, in accordance with the implementations described herein, the second UE 115 may reserve resources via the SCI that correspond to other reception opportunities within the reception occasion 1005. For example, the SCI may reserve resources corresponding to a reception opportunity 1015 (which may be associated with a receive beam 1030) and may reserve resources corresponding to a reception opportunity 1020 (which may be associated with a receive beam 1035). As a result, a DCI 3_0 (sent from the base station 105 to the second UE 115) may grant up to three PSSCH resources for transmitting a transport block, and a similar grant of three PSSCH resources may be achieved via a sidelink configured grant as well.

In some implementations, the base station 105 may instruct the second UE 115 to set a redundancy version for each PSSCH transmission to zero to fully exploit the spatial diversity associated with the configured beam-sweeping reception at the first UE 115. Additionally, in some implementations, early termination at the second UE 115 may be naturally supported as a result of either sidelink feedback or on the basis of the second UE 115 reserving resources for its own transmissions, or a combination thereof. In some examples, such use of a single grant to the second UE 115 may mitigate signaling overhead and increase spectral efficiency between the base station 105 and the second UE 115. In some other examples, however, the base station 105 may issue multiple grants to the second UE 115 for transmitting SCI and PSSCH towards configured reception opportunities within a configured reception occasion, as described in more detail with reference to FIG. 11, which may support greater sidelink reliability.

Figure 11:
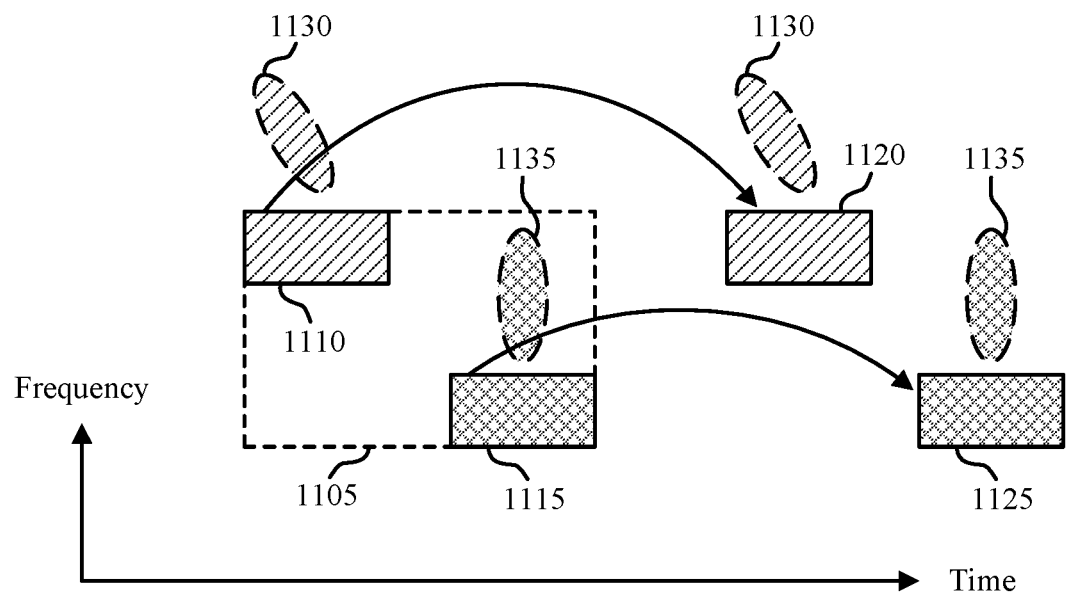

FIG. 11 illustrates an example of a communication timeline 1100 that supports techniques for configured beam-sweeping reception for NR sidelink in accordance with various aspects of the present disclosure. The communication timeline 1100 may implement or be implemented to realize aspects of the wireless communications system 100 or the wireless communications system 200. For example, the communication timeline 1100 may illustrate communication between a first UE 115 (e.g., a sidelink receiver) and a second UE 115 (e.g., a sidelink transmitter) over a configured set of reception opportunities within each of a set of periodic reception occasions 1105.

In some examples, a serving base station 105 may issue multiple grants, either dynamic or configured, to the second UE 115 to send a transport block towards a configured reception opportunity within a configured reception occasion 1105. For example, if the first UE 115 is configured with two reception opportunities including a reception opportunity 1110 (which may be associated with a receive beam 1130) and a reception opportunity 1115 (which may be associated with a receive beam 1135), the base station 105 may transmit two grants, of which each occupies a reception opportunity for its first or initial transmission (as opposed to a reserved resource occupying a reception opportunity). In some examples, the base station 105 and the second UE 115 may couple the two grants together so that the second UE 115 is able to use them to transmit the same transport block and to conduct early termination between them.

Further, as a result of providing multiple grants (e.g., such as one grant for each reception opportunity), the second UE 115 may use PSSCH reservation bits in SCI to reserve resources for possible re-transmissions of the PSSCH. For example, the second UE 115 may reserve a PSSCH resource 1120 (which may be associated with the same receive beam 1130 as the reserving SCI) via the transmission over the reception opportunity 1110 and may reserve a PSSCH resource 1125 (which may be associated with the same receive beam 1135 as the reserving SCI) via the transmission over the reception opportunity 1115. As such, the first UE 115 and the second UE 115 may experience a greater likelihood for successful communication within the reception occasion 1105.

Figure 12:
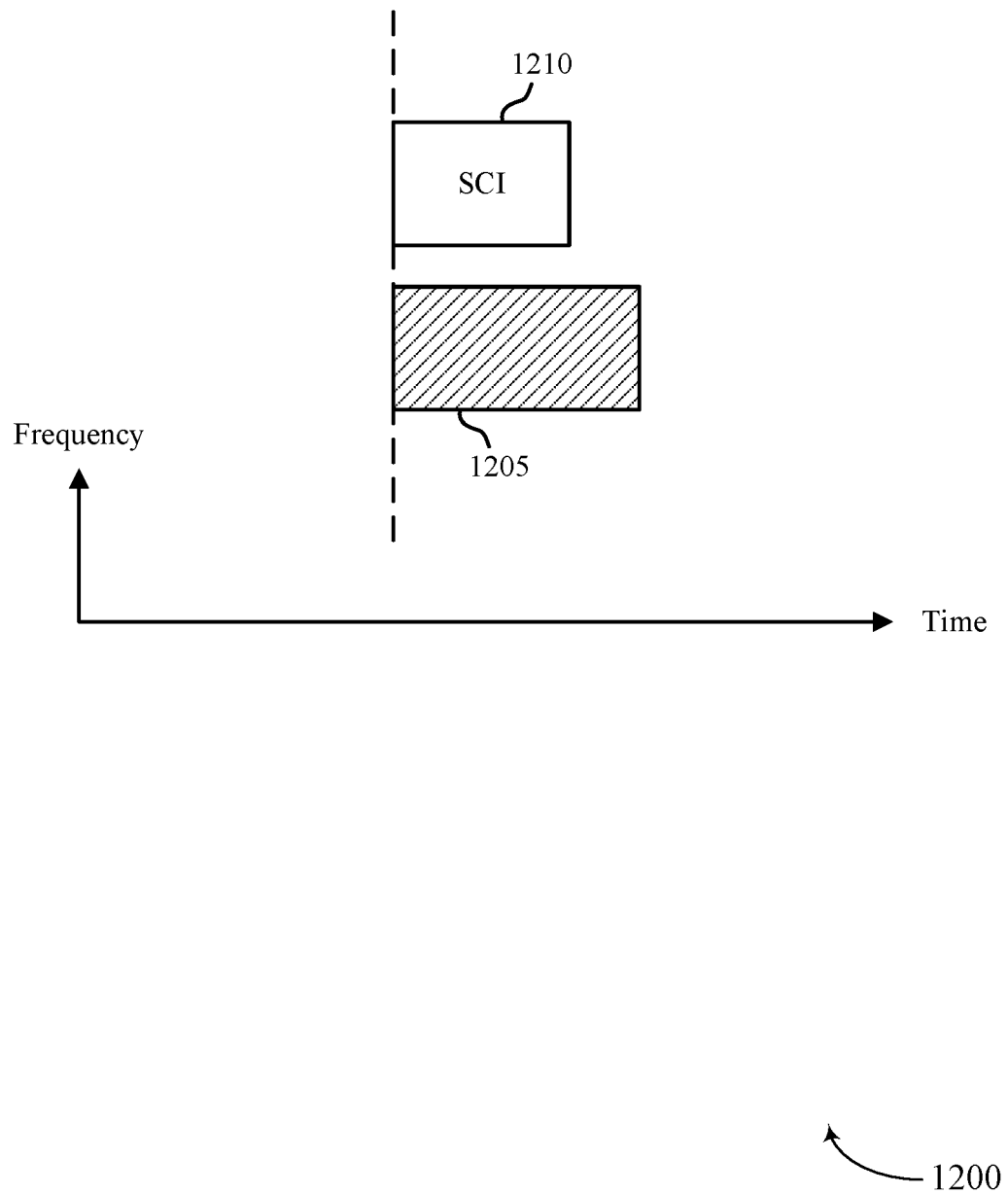

FIG. 12 illustrates an example of a communication timeline 1200 that supports techniques for configured beam-sweeping reception for NR sidelink in accordance with various aspects of the present disclosure. The communication timeline 1200 may implement or be implemented to realize aspects of the wireless communications system 100 or the wireless communications system 200. For example, the communication timeline 1200 may illustrate communication between a first UE 115 (e.g., a sidelink receiver) and a second UE 115 (e.g., a sidelink transmitter) over a reception opportunity 1205 within a reception occasion and may illustrate how a serving base station 105 may re-schedule the resource assigned to the reception opportunity 1205 for other sidelink communication.

In some implementations, for example, the base station 105 may re-schedule the resource assigned to the configured reception opportunity 1205 to another sidelink device whose 16-bit destination L2 ID is different from that of the first UE 115 (e.g., the sidelink receiver that receives the configuration of the set of periodic reception occasions). In such implementations, and to avoid unnecessary PUCCH transmissions, the first UE 115 may be configured to send PUCCH NACK if (e.g., only if) it is the destination UE in the decoded SCI. In other words, for example, the first UE 115 may transmit a NACK if the first UE 115 decoded a valid SCI successfully but failed to decode PSSCH data and may refrain from transmitting a NACK if the first UE 115 failed to decode a valid SCI. As such, the first UE 115 may refrain from transmitting feedback for communication over resources that are re-scheduled away from the first UE 115.

Additionally or alternatively, the base station 105 may re-schedule the resource attached to any configured reception opportunity (e.g., the reception opportunity 1205) to other sidelink communication with an SCI 1210 sitting or located at a lower-indexed leading sub-channel. For example, the base station 105 may re-schedule the resource for the reception opportunity 1205 to the SCI 1210 that is associated with a lower-indexed leading sub-channel. In such examples, the first UE 115 may fail to read an SCI from its configured resource (e.g., the reception opportunity 1205) and may transition to monitoring or the SCI over a next reception opportunity within the same reception occasion or terminating monitoring until a next reception occasion (if the reception opportunity 1205 is a final reception opportunity with the reception occasion).

Figure 13:
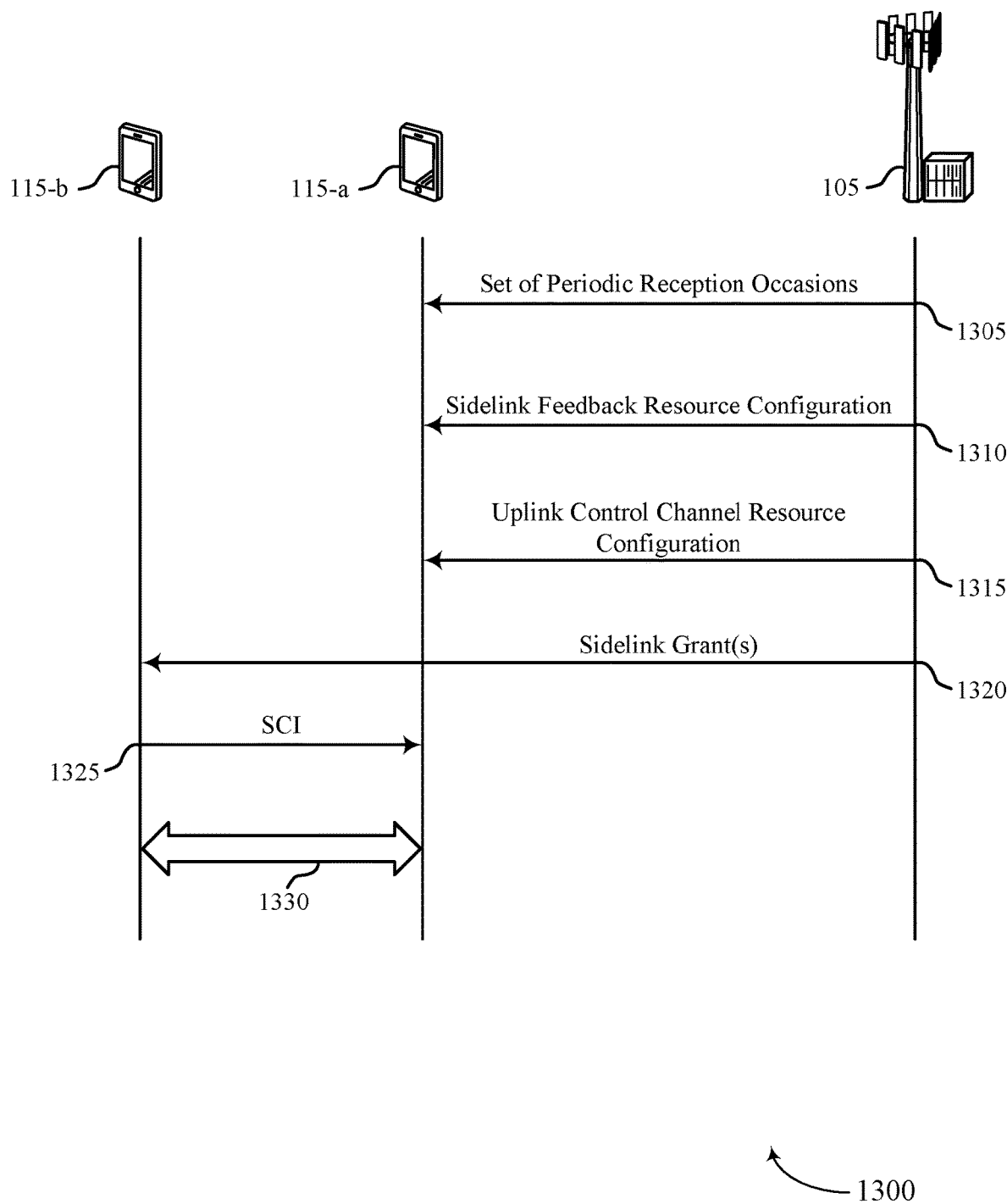
FIG. 13 illustrates an example of a process flow that supports techniques for configured beam-sweeping reception for NR sidelink in accordance with various aspects of the present disclosure.

FIG. 13 illustrates an example of a process flow 1300 that supports techniques for configured beam-sweeping reception for NR sidelink in accordance with various aspects of the present disclosure. The process flow 1300 may implement or be implemented to realize aspects of the wireless communications system 100 or the wireless communications system 200. For example, the process flow 1300 may illustrate communication between a UE 115-*a*, a UE 115-*b*, and a base station 105, which may be examples of corresponding devices described herein, including with reference to FIGS. 1 and 2. In some examples, the base station 105 may transmit an indication of a set of periodic reception occasions to the UE 115-*a*, each reception occasion of the set of periodic reception occasions including multiple reception opportunities that are each associated with a different receive beam. The UE 115-*a* may use the configured reception occasions and reception opportunities for monitoring for SCI from the UE 115-*b*.

In the following description of the process flow 1300, the operations may be performed (e.g., reported or provided) in a different order than the order shown, or the operations performed by the example devices may be performed in different orders or at different times. For example, specific operations may also be left out of the process flow 1300, or other operations may be added to the process flow 1300. Further, although some operations or signaling may be shown to occur at different times for discussion purposes, these operations may actually occur at the same time.

At 1305, the UE 115-*a* may receive, from the base station 105, an indication of a set of periodic reception occasions, each reception occasion including multiple reception opportunities for receiving SCI from the UE 115-*b*. In some implementations, each reception opportunity of the multiple reception opportunities is associated with a different receive beam (e.g., a different QCL source). Additional details relating to such a configuration of the set of periodic reception occasions are described herein, including with reference to FIGS. 2 and 6.

At 1310, the UE 115-*a* may receive, from the base station 105, a configuration of multiple sidelink feedback resources that each correspond to one of the multiple reception opportunities associated with each reception occasion. In some examples, the configuration may indicate a same QCL source or a same QCL relationship for corresponding sidelink feedback resources and reception opportunities. Additional details relating to such a configuration of the sidelink feedback resources are described herein, including with reference to FIG. 8.

At 1315, the UE 115-a may receive, from the base station 105, a configuration of multiple uplink control channel resources (e.g., uplink feedback resources) that each correspond to one of the multiple reception opportunities associated with each reception occasion. In some examples, the configuration may indicate, for each uplink control channel resource, whether that uplink control channel resource is exclusively for ACK feedback or for either ACK or NACK feedback. In some examples, the configuration may also configure a supplemental (e.g., a late or final) uplink control channel resource. Additional details relating to such a configuration of the uplink control channel resources for uplink feedback are described herein, including with reference to FIG. 9.

At 1320, the base station 105 may transmit, to the UE 115-b, one or multiple grants for transmitting the SCI to the UE 115-a. The one or multiple grants may allocate resources corresponding to at least one of the multiple reception opportunities associated with a first reception occasion. Additional details relating to such a transmission of one or multiple grants to the UE 115-b (e.g., a sidelink transmitter) are described herein, including with reference to FIGS. 10 and 11.

At 1325, the UE 115-b may transmit SCI to the UE 115-a. The UE 115-a may monitor for the SCI over one or more of the reception opportunities during a given or current reception occasion and, in some examples, may switch to using different receive beams for each reception opportunity. Additional details relating to such configured monitoring and beam-sweeping reception by the UE 115-a (e.g., a sidelink receiver) are described herein, including with reference to FIGS. 6 and 7.

At 1330, the UE 115-b and the UE 115-a may communicate with each other in accordance with whether the UE 115-a successfully or unsuccessfully decodes the SCI from the UE 115-b. Such communication may refer to a receiving and a decoding of corresponding sidelink data (provided over either same-slot PSSCH or in a reserved PSSCH resource), transmitting sidelink feedback, or any other sidelink transmissions that the UE 115-b or the UE 115-a, or both, may send as a result of the SCI decoding.

Figure 14:
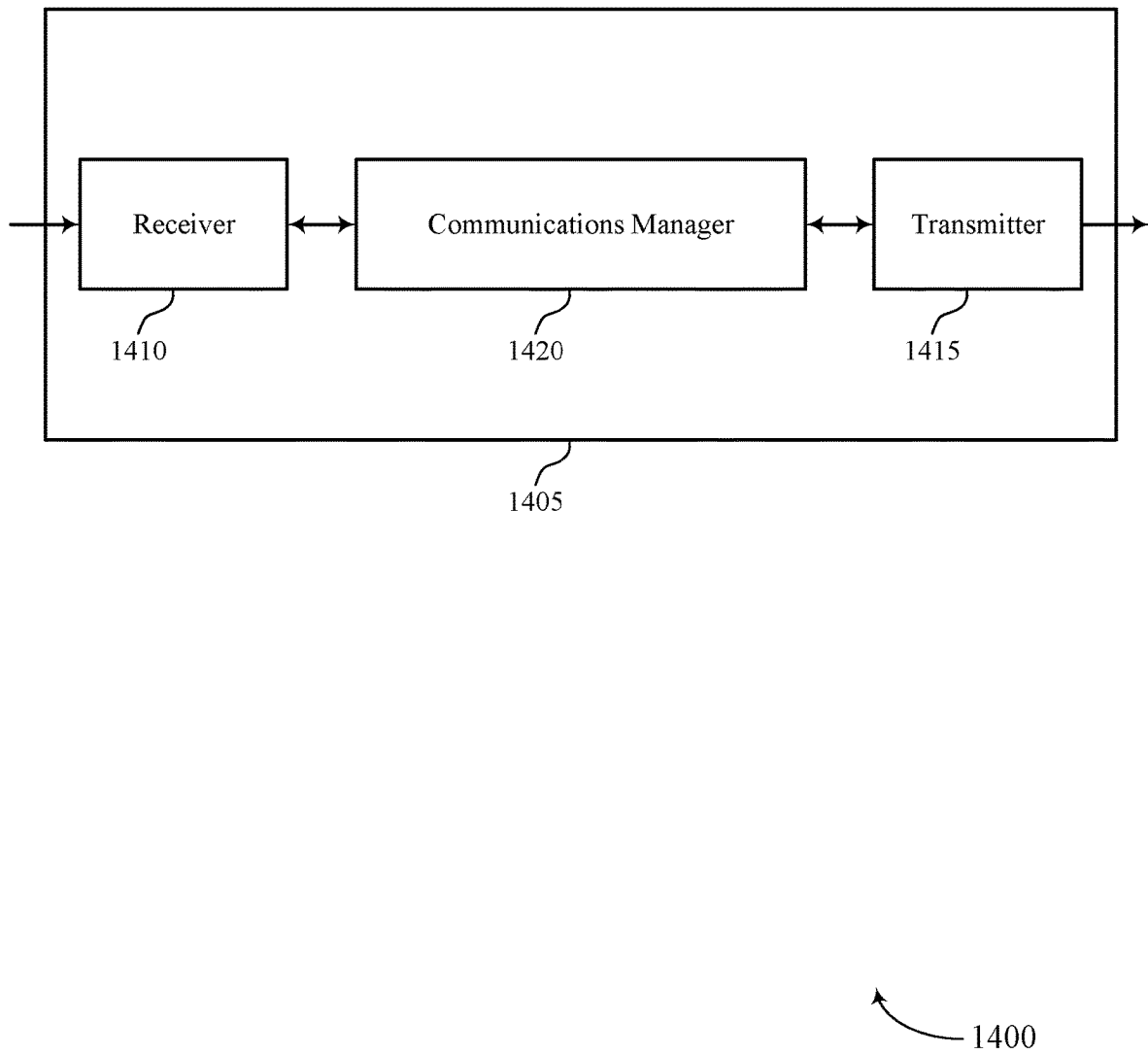
FIGS. 14 and 15 show block diagrams of devices that support techniques for configured beam-sweeping reception for NR sidelink in accordance with various aspects of the present disclosure.

FIG. 14 shows a block diagram 1400 of a device 1405 that supports techniques for configured beam-sweeping reception for NR sidelink in accordance with various aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for configured beam-sweeping reception for NR sidelink). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for configured beam-sweeping reception for NR sidelink). In some examples, the transmitter 1415 may be co-located with a receiver 1410 in a transceiver component. The transmitter 1415 may utilize a single antenna or a set of multiple antennas.

The communications manager 1420, the receiver 1410, the transmitter 1415, or various combinations thereof or various components thereof may be examples of means for performing various aspects of techniques for configured beam-sweeping reception for NR sidelink as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at first UE in accordance with examples as disclosed herein. For example, the communications manager 1420 may be configured as or otherwise support a means for receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The communications manager 1420 may be configured as or otherwise support a means for monitoring, using one or more receive beams associated with one or more reception opportunities, for the SCI over the one or more reception opportunities associated with a first reception occasion. The communications manager 1420 may be configured as or otherwise support a means for decoding whether the SCI is present during a reception opportunity as a result of the monitoring. The communications manager 1420 may be configured as or otherwise support a means for communicating with the second UE in accordance with the decoding.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing, reduced power consumption, and more efficient utilization of communication resources.

Figure 15:
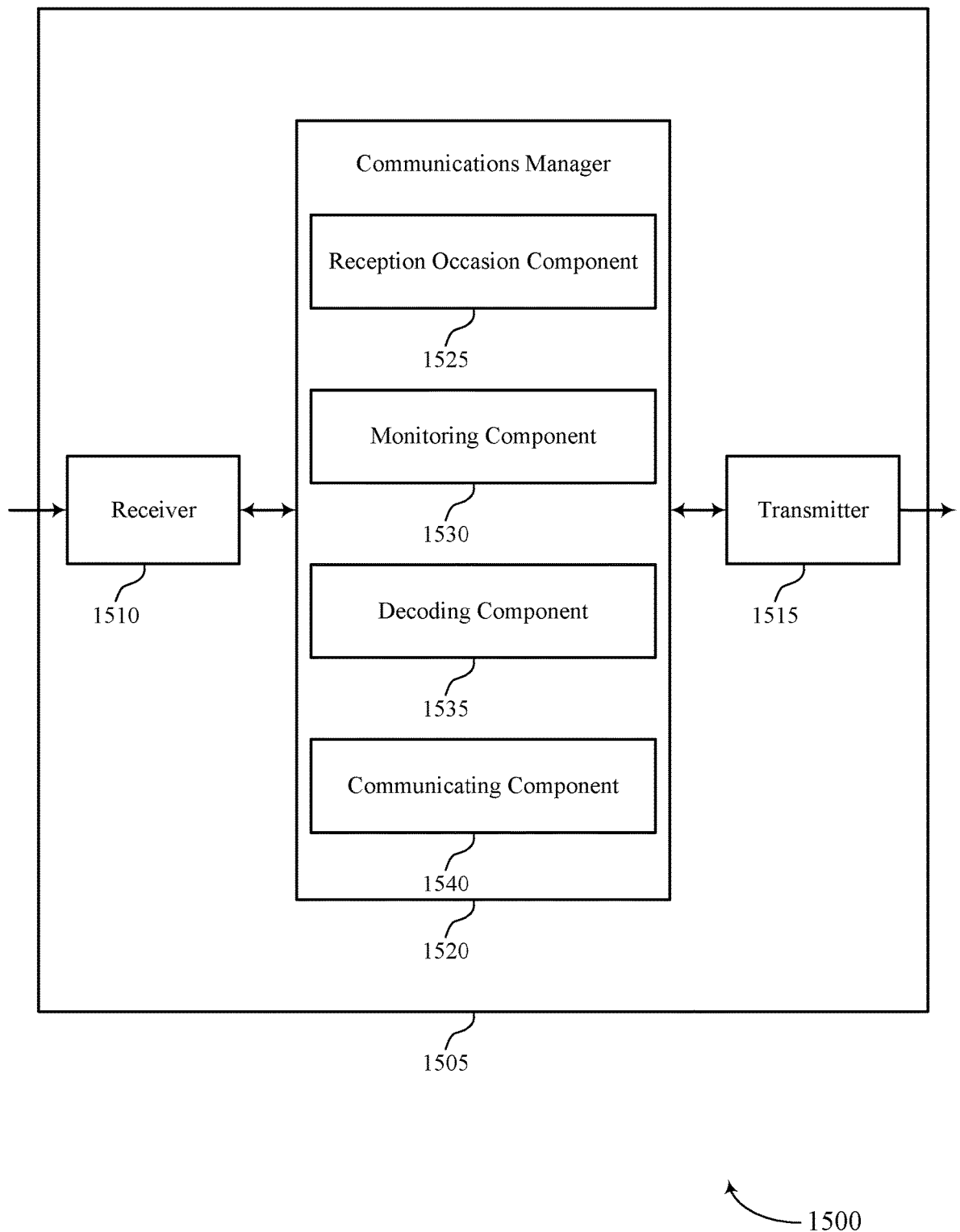

FIG. 15 shows a block diagram 1500 of a device 1505 that supports techniques for configured beam-sweeping reception for NR sidelink in accordance with various aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for configured beam-sweeping reception for NR sidelink). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for configured beam-sweeping reception for NR sidelink). In some examples, the transmitter 1515 may be co-located with a receiver 1510 in a transceiver component. The transmitter 1515 may utilize a single antenna or a set of multiple antennas.

The device 1505, or various components thereof, may be an example of means for performing various aspects of techniques for configured beam-sweeping reception for NR sidelink as described herein. For example, the communications manager 1520 may include a reception occasion component 1525, a monitoring component 1530, a decoding component 1535, a communicating component 1540, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at first UE in accordance with examples as disclosed herein. The reception occasion component 1525 may be configured as or otherwise support a means for receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The monitoring component 1530 may be configured as or otherwise support a means for monitoring, using one or more receive beams associated with one or more reception opportunities, for the SCI over the one or more reception opportunities associated with a first reception occasion. The decoding component 1535 may be configured as or otherwise support a means for decoding whether the SCI is present during a reception opportunity as a result of the monitoring. The communicating component 1540 may be configured as or otherwise support a means for communicating with the second UE in accordance with the decoding.

Figure 16:
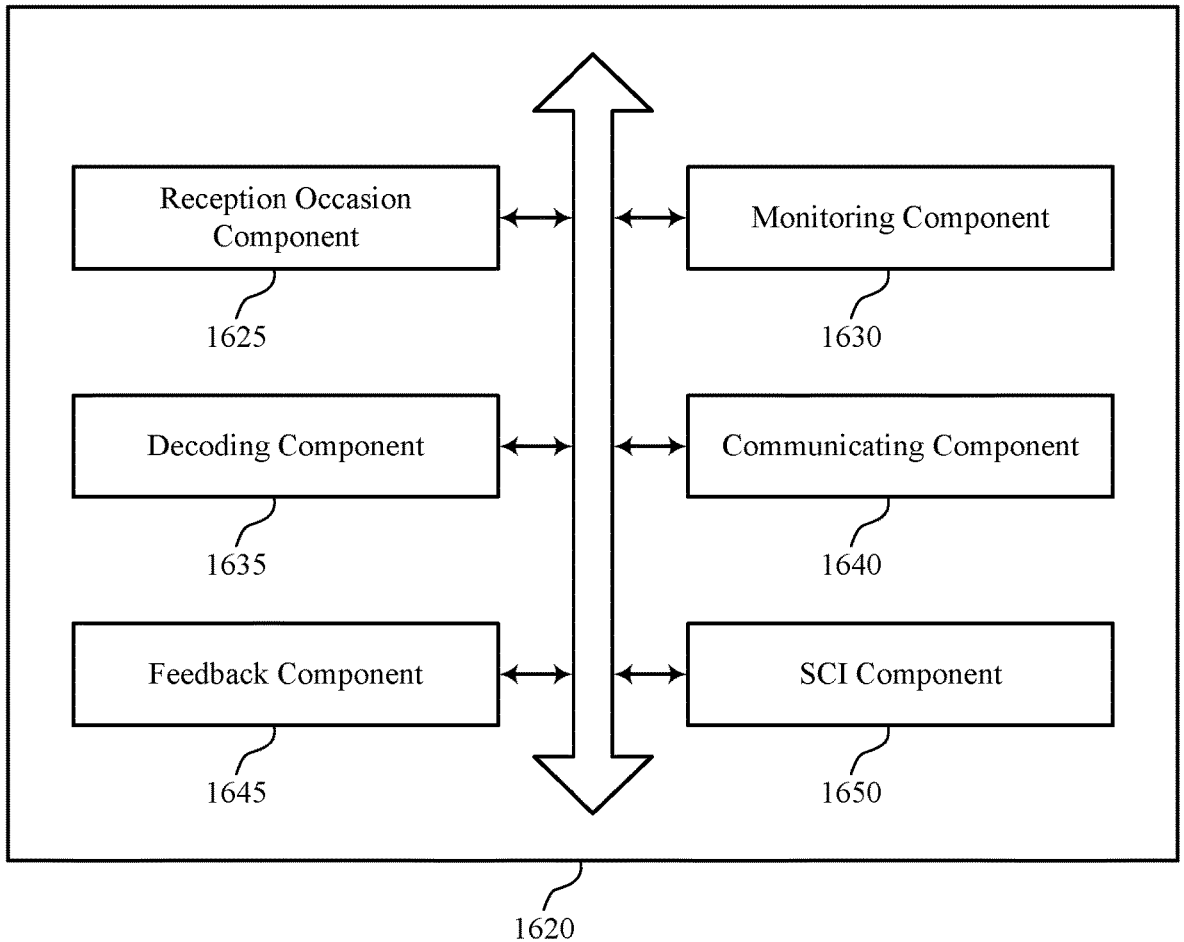
FIG. 16 shows a block diagram of a communications manager that supports techniques for configured beam-sweeping reception for NR sidelink in accordance with various aspects of the present disclosure.

FIG. 16 shows a block diagram 1600 of a communications manager 1620 that supports techniques for configured beam-sweeping reception for NR sidelink in accordance with various aspects of the present disclosure. The communications manager 1620 may be an example of aspects of a communications manager 1420, a communications manager 1520, or both, as described herein. The communications manager 1620, or various components thereof, may be an example of means for performing various aspects of techniques for configured beam-sweeping reception for NR sidelink as described herein. For example, the communications manager 1620 may include a reception occasion component 1625, a monitoring component 1630, a decoding component 1635, a communicating component 1640, a feedback component 1645, an SCI component 1650, or any combination thereof. Each of these components may communicate, directly or indirectly, with one another (e.g., via one or more buses).

The communications manager 1620 may support wireless communication at first UE in accordance with examples as disclosed herein. The reception occasion component 1625 may be configured as or otherwise support a means for receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The monitoring component 1630 may be configured as or otherwise support a means for monitoring, using one or more receive beams associated with one or more reception opportunities, for the SCI over the one or more reception opportunities associated with a first reception occasion. The decoding component 1635 may be configured as or otherwise support a means for decoding whether the SCI is present during a reception opportunity as a result of the monitoring. The communicating component 1640 may be configured as or otherwise support a means for communicating with the second UE in accordance with the decoding.

In some examples, the feedback component 1645 may be configured as or otherwise support a means for receiving, from the base station, a configuration of a set of multiple sidelink feedback resources that each correspond to one of the set of multiple reception opportunities associated with each reception occasion, where the configuration indicates a same QCL source for corresponding sidelink feedback resources and reception opportunities.

In some examples, to support communicating with the second UE in accordance with the decoding, the feedback component 1645 may be configured as or otherwise support a means for transmitting, to the second UE using a first directional beam, feedback over a first sidelink feedback resource corresponding to the reception opportunity based on decoding whether the SCI is present during the reception opportunity, where the reception opportunity and the first sidelink feedback resource are both associated with a same first QCL source corresponding to the first directional beam in accordance with the configuration.

In some examples, the feedback component 1645 may be configured as or otherwise support a means for receiving, from the base station, a configuration of a set of multiple uplink control channel resources that each correspond to one of the set of multiple reception opportunities associated with each reception occasion, where the configuration indicates, for each uplink control channel resource, whether that uplink control channel resource is exclusively for positive ACK feedback or for either positive ACK feedback or NACK feedback.

In some examples, the configuration indicates that each uplink control channel resource is exclusively for positive ACK feedback.

In some examples, the configuration indicates that a first subset of uplink control channel resources within each reception occasion are exclusively for positive ACK feedback and that a final uplink control channel resource within each reception occasion is for either positive ACK feedback or NACK feedback.

In some examples, a supplemental uplink control channel resource for each reception occasion in addition to the set of multiple uplink control channel resources that each correspond to one of the set of multiple reception opportunities included within each reception occasion. In some examples, that each uplink control channel resource of the set of multiple uplink control channel resources is exclusively for positive ACK feedback and that the supplemental uplink control channel resource is for either positive ACK feedback or NACK feedback.

In some examples, the SCI component 1650 may be configured as or otherwise support a means for receiving, from the second UE, the SCI over a first reception opportunity associated with the first reception occasion, where the SCI indicates sidelink shared channel resource reservations for a remainder of the set of multiple reception opportunities associated with the first reception occasion.

In some examples, the SCI component 1650 may be configured as or otherwise support a means for receiving, from the second UE, the SCI and sidelink data in a first reception opportunity associated with the first reception occasion, where the SCI indicates a sidelink shared channel resource reservation for a re-transmission of the sidelink data, the sidelink shared channel resource reservation outside of the first reception occasion.

In some examples, to support monitoring for the SCI, the monitoring component 1630 may be configured as or otherwise support a means for monitoring for the SCI over a first reception opportunity during a first time period using a first receive beam. In some examples, to support monitoring for the SCI, the monitoring component 1630 may be configured as or otherwise support a means for switching to monitoring for the SCI over a second reception opportunity during a second time period using a second receive beam after the first time period based on failing to decode the SCI or corresponding sidelink data over the first reception opportunity.

In some examples, to support monitoring for the SCI, the monitoring component 1630 may be configured as or otherwise support a means for monitoring for the SCI over the first reception opportunity during a first time period using a first receive beam. In some examples, to support monitoring for the SCI, the monitoring component 1630 may be configured as or otherwise support a means for refraining from monitoring for the SCI over the second reception opportunity based on successfully decoding the SCI and corresponding sidelink data over the first reception opportunity.

In some examples, each reception opportunity of the set of multiple reception opportunities includes a different set of time and frequency resources.

Figure 17:
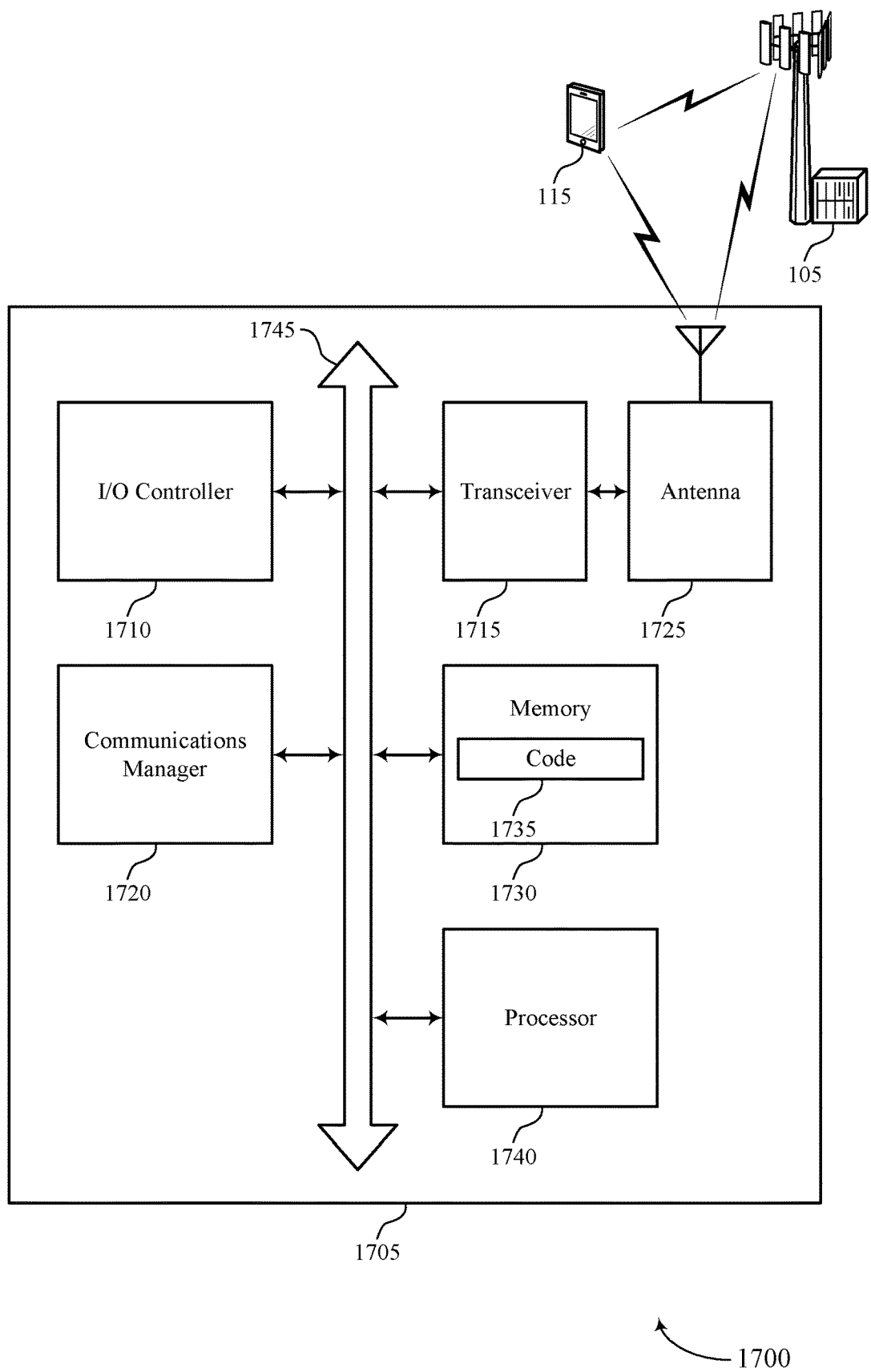
FIG. 17 shows a diagram of a system including a device that supports techniques for configured beam-sweeping reception for NR sidelink in accordance with various aspects of the present disclosure.

FIG. 17 shows a diagram of a system 1700 including a device 1705 that supports techniques for configured beam-sweeping reception for NR sidelink in accordance with various aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for configured beam-sweeping reception for NR sidelink). For example, the device 1705 or a component of the device 1705 may include a processor 1740 and memory 1730 coupled to the processor 1740, the processor 1740 and memory 1730 configured to perform various functions described herein.

The communications manager 1720 may support wireless communication at first UE in accordance with examples as disclosed herein. For example, the communications manager 1720 may be configured as or otherwise support a means for receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The communications manager 1720 may be configured as or otherwise support a means for monitoring, using one or more receive beams associated with one or more reception opportunities, for the SCI over the one or more reception opportunities associated with a first reception occasion. The communications manager 1720 may be configured as or otherwise support a means for decoding whether the SCI is present during a reception opportunity as a result of the monitoring. The communications manager 1720 may be configured as or otherwise support a means for communicating with the second UE in accordance with the decoding.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for configured beam-sweeping reception for NR sidelink as described herein, or the processor 1740 and the memory 1730 may be otherwise configured to perform or support such operations.

Figure 18:
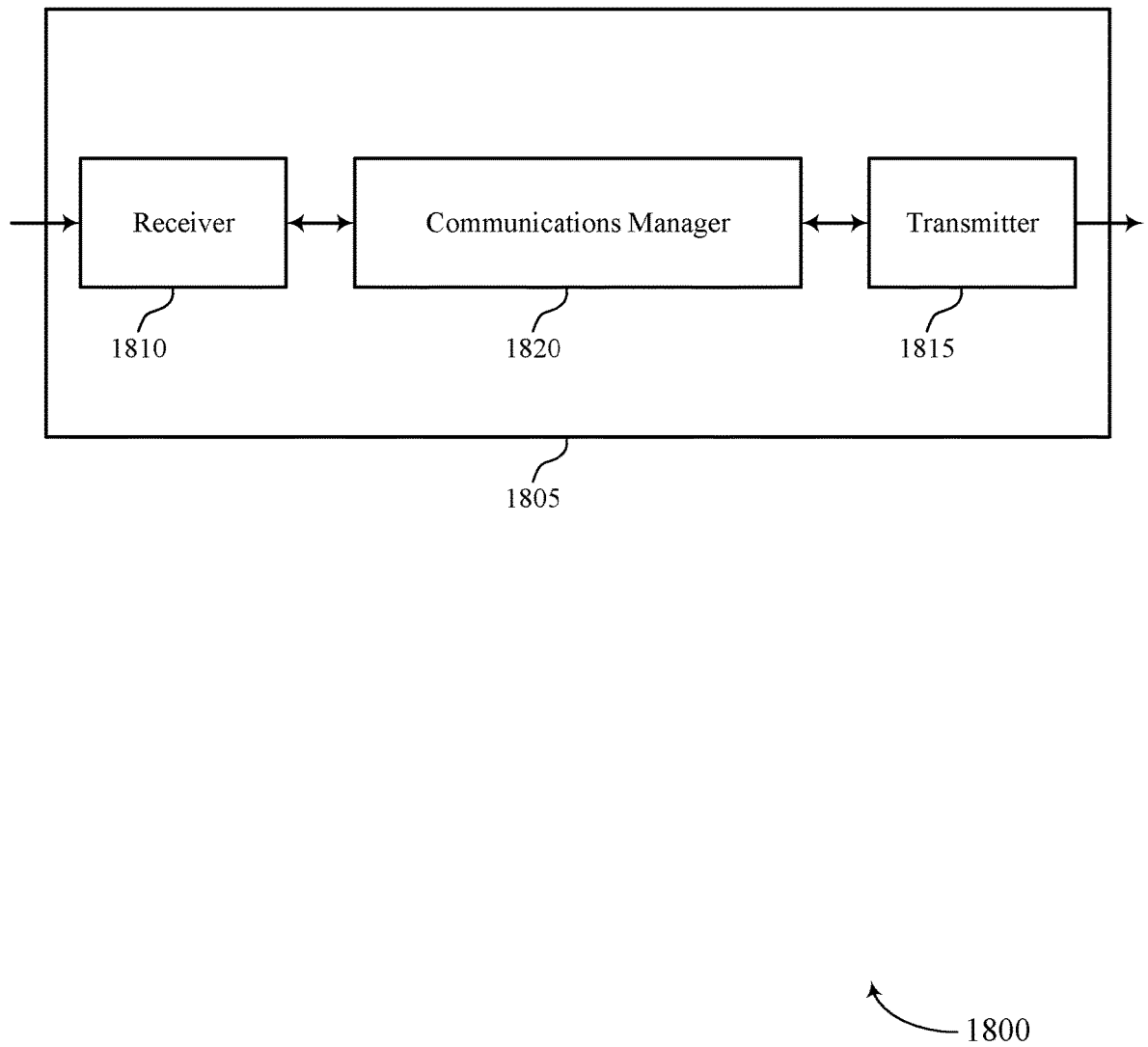
FIGS. 18 and 19 show block diagrams of devices that support techniques for configured beam-sweeping reception for NR sidelink in accordance with various aspects of the present disclosure.

FIG. 18 shows a block diagram 1800 of a device 1805 that supports techniques for configured beam-sweeping reception for NR sidelink in accordance with various aspects of the present disclosure. The device 1805 may be an example of aspects of a base station 105 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to techniques for configured beam-sweeping reception for NR sidelink). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to techniques for configured beam-sweeping reception for NR sidelink). In some examples, the transmitter 1815 may be co-located with a receiver 1810 in a transceiver component. The transmitter 1815 may utilize a single antenna or a set of multiple antennas.

The communications manager 1820, the receiver 1810, the transmitter 1815, or various combinations thereof or various components thereof may be examples of means for performing various aspects of techniques for configured beam-sweeping reception for NR sidelink as described herein. For example, the communications manager 1820, the receiver 1810, the transmitter 1815, or various combinations or components thereof may support a method for performing one or more of the functions described herein.

In some examples, the communications manager 1820, the receiver 1810, the transmitter 1815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1820, the receiver 1810, the transmitter 1815, or various combinations or components thereof may be implemented in code (e.g., as communications management software or firmware) executed by a processor. If implemented in code executed by a processor, the functions of the communications manager 1820, the receiver 1810, the transmitter 1815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1820 may be configured to perform various operations (e.g., receiving, monitoring, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to receive information, transmit information, or perform various other operations as described herein.

The communications manager 1820 may support wireless communication at a base station in accordance with examples as disclosed herein. For example, the communications manager 1820 may be configured as or otherwise support a means for transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The communications manager 1820 may be configured as or otherwise support a means for transmitting, to the second UE, a grant for transmitting the SCI to the first UE over at least one of the set of multiple reception opportunities associated with a first reception occasion. The communications manager 1820 may be configured as or otherwise support a means for communicating with one or both of the first UE or the second UE based on transmitting the indication of the set of periodic reception occasions and the grant.

By including or configuring the communications manager 1820 in accordance with examples as described herein, the device 1805 (e.g., a processor controlling or otherwise coupled to the receiver 1810, the transmitter 1815, the communications manager 1820, or a combination thereof) may support techniques for reduced processing, reduced power consumption, and more efficient utilization of communication resources.

Figure 19:
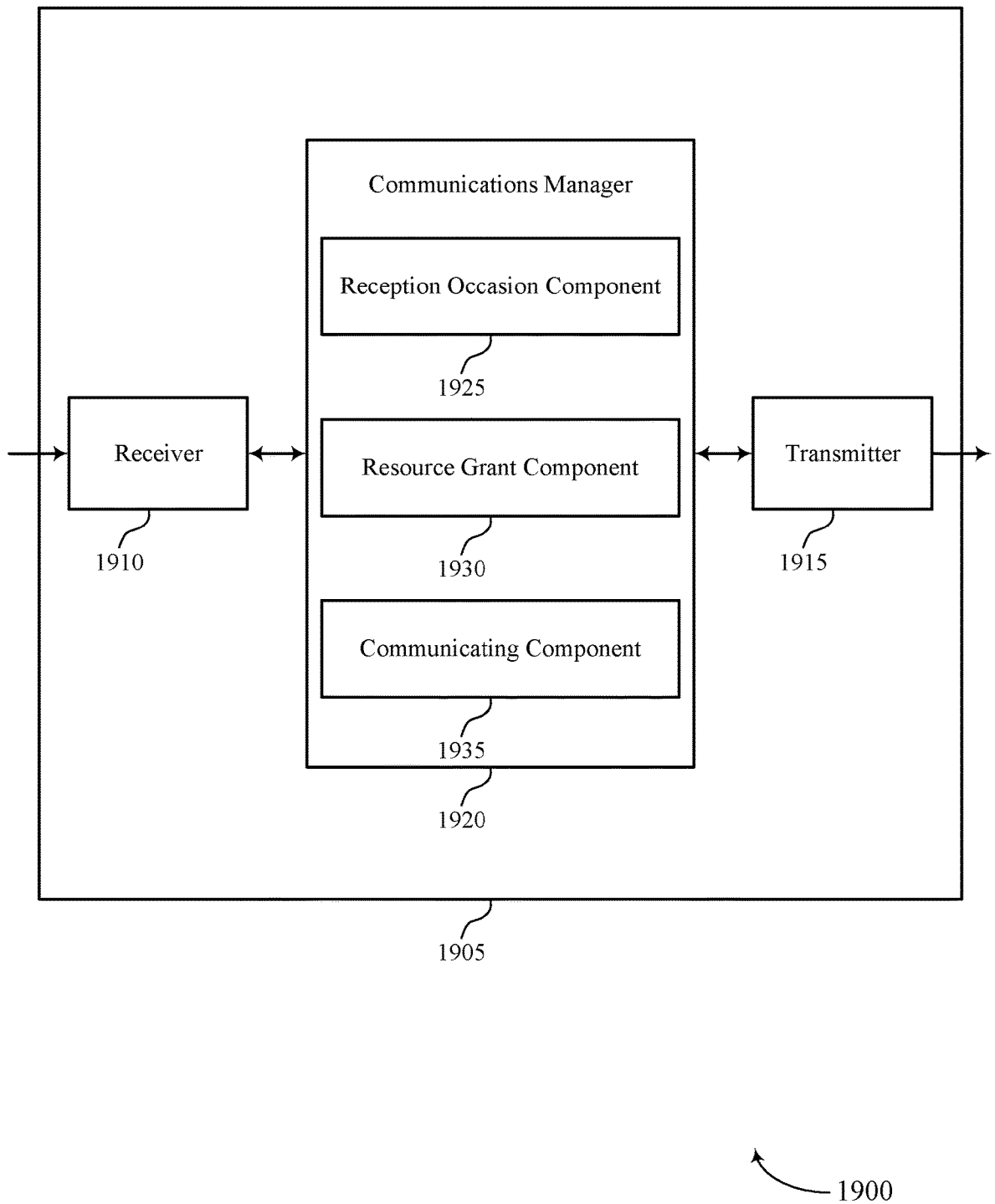

FIG. 19 shows a block diagram 1900 of a device 1905 that supports techniques for configured beam-sweeping reception for NR sidelink in accordance with various aspects of the present disclosure. The device 1905 may be an example of aspects of a device 1805 or a base station 105 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to techniques for configured beam-sweeping reception for NR sidelink). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to techniques for configured beam-sweeping reception for NR sidelink). In some examples, the transmitter 1915 may be co-located with a receiver 1910 in a transceiver component. The transmitter 1915 may utilize a single antenna or a set of multiple antennas.

The device 1905, or various components thereof, may be an example of means for performing various aspects of techniques for configured beam-sweeping reception for NR sidelink as described herein. For example, the communications manager 1920 may include a reception occasion component 1925, a resource grant component 1930, a communicating component 1935, or any combination thereof. The communications manager 1920 may be an example of aspects of a communications manager 1820 as described herein. In some examples, the communications manager 1920, or various components thereof, may be configured to perform various operations (e.g., receiving, monitoring, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to receive information, transmit information, or perform various other operations as described herein.

The communications manager 1920 may support wireless communication at a base station in accordance with examples as disclosed herein. The reception occasion component 1925 may be configured as or otherwise support a means for transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The resource grant component 1930 may be configured as or otherwise support a means for transmitting, to the second UE, a grant for transmitting the SCI to the first UE over at least one of the set of multiple reception opportunities associated with a first reception occasion. The communicating component 1935 may be configured as or otherwise support a means for communicating with one or both of the first UE or the second UE based on transmitting the indication of the set of periodic reception occasions and the grant.

Figure 20:
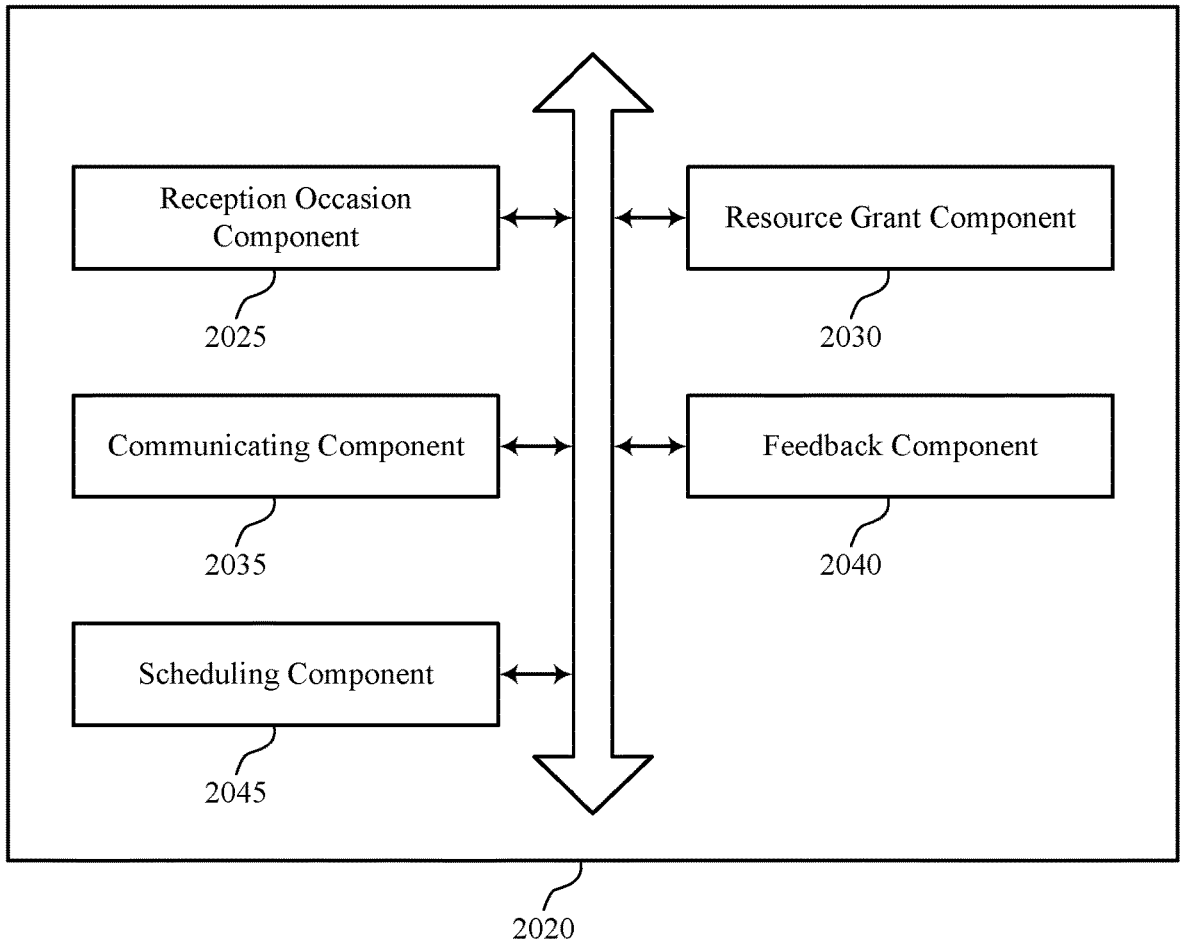
FIG. 20 shows a block diagram of a communications manager that supports techniques for configured beam-sweeping reception for NR sidelink in accordance with various aspects of the present disclosure.

FIG. 20 shows a block diagram 2000 of a communications manager 2020 that supports techniques for configured beam-sweeping reception for NR sidelink in accordance with various aspects of the present disclosure. The communications manager 2020 may be an example of aspects of a communications manager 1820, a communications manager 1920, or both, as described herein. The communications manager 2020, or various components thereof, may be an example of means for performing various aspects of techniques for configured beam-sweeping reception for NR sidelink as described herein. For example, the communications manager 2020 may include a reception occasion component 2025, a resource grant component 2030, a communicating component 2035, a feedback component 2040, a scheduling component 2045, or any combination thereof.

Each of these components may communicate, directly or indirectly, with one another (e.g., via one or more buses).

The communications manager 2020 may support wireless communication at a base station in accordance with examples as disclosed herein. The reception occasion component 2025 may be configured as or otherwise support a means for transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The resource grant component 2030 may be configured as or otherwise support a means for transmitting, to the second UE, a grant for transmitting the SCI to the first UE over at least one of the set of multiple reception opportunities associated with a first reception occasion. The communicating component 2035 may be configured as or otherwise support a means for communicating with one or both of the first UE or the second UE based on transmitting the indication of the set of periodic reception occasions and the grant.

In some examples, the feedback component 2040 may be configured as or otherwise support a means for transmitting, to the first UE, a configuration of a set of multiple sidelink feedback resources that each correspond to one of the set of multiple reception opportunities associated with each reception occasion, where the configuration indicates a same QCL source for corresponding sidelink feedback resources and reception opportunities.

In some examples, the feedback component 2040 may be configured as or otherwise support a means for transmitting, to the first UE, a configuration of a set of multiple uplink control channel resources that each correspond to one of the set of multiple reception opportunities associated with each reception occasion, where the configuration indicates, for each uplink control channel resource, whether that uplink control channel resource is exclusively for positive ACK feedback or for either positive ACK feedback or NACK feedback.

In some examples, the configuration indicates that each uplink control channel resource is exclusively for positive ACK feedback.

In some examples, the configuration indicates that a first subset of uplink control channel resources within each reception occasion are exclusively for positive ACK feedback and that a final uplink control channel resource within each reception occasion is for either positive ACK feedback or NACK feedback.

In some examples, a supplemental uplink control channel resource for each reception occasion in addition to the set of multiple uplink control channel resources that each correspond to one of the set of multiple reception opportunities included within each reception occasion. In some examples, that each uplink control channel resource of the set of multiple uplink control channel resources is exclusively for positive ACK feedback and that the supplemental uplink control channel resource is for either positive ACK feedback or NACK feedback.

In some examples, to support transmitting the grant to the second UE, the resource grant component 2030 may be configured as or otherwise support a means for transmitting a single grant scheduling the second UE to transmit the SCI over a first reception opportunity associated with the first reception occasion, where the SCI indicates sidelink shared channel resource reservations for a remainder of the set of multiple reception opportunities associated with the first reception occasion.

In some examples, to support transmitting the grant to the second UE, the resource grant component 2030 may be configured as or otherwise support a means for transmitting a plurality grants scheduling the second UE to transmit the SCI and sidelink data over the set of multiple reception opportunities associated with the first reception occasion, where the SCI indicates a sidelink shared channel resource reservation for a re-transmission of the sidelink data, the sidelink shared channel resource reservation outside of the first reception occasion.

In some examples, the scheduling component 2045 may be configured as or otherwise support a means for re-scheduling a resource associated with a reception opportunity for sidelink communication to a third UE, where the third UE has a different identifier than the first UE.

In some examples, the scheduling component 2045 may be configured as or otherwise support a means for re-scheduling a resource associated with a reception opportunity for sidelink communication to a third UE, where the sidelink communication includes second SCI for the third UE, the second SCI associated with a lower-indexed sub-channel than the resource associated with the reception opportunity.

In some examples, each reception opportunity of the set of multiple reception opportunities includes a different set of time and frequency resources.

Figure 21:
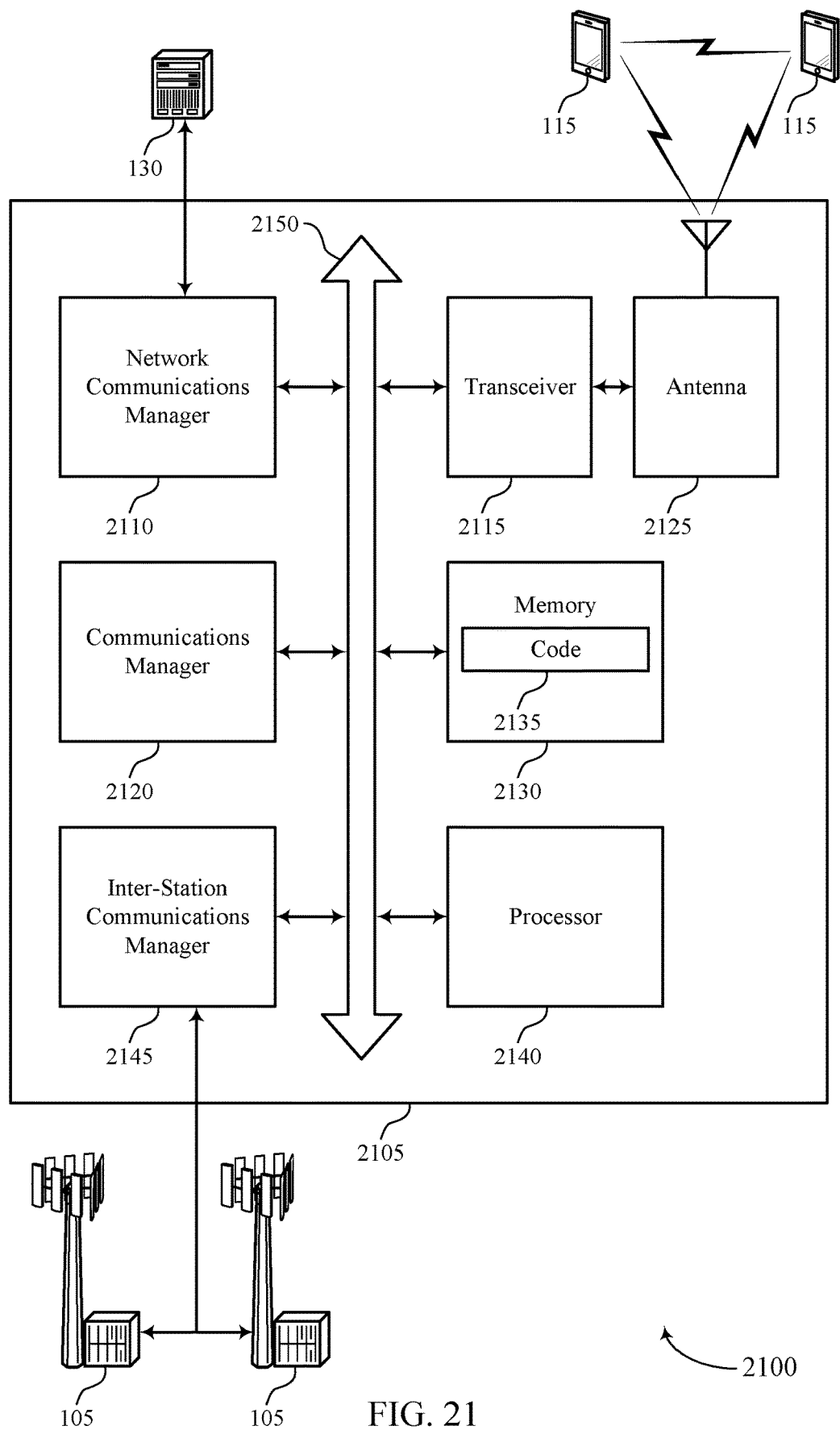
FIG. 21 shows a diagram of a system including a device that supports techniques for configured beam-sweeping reception for NR sidelink in accordance with various aspects of the present disclosure.

FIG. 21 shows a diagram of a system 2100 including a device 2105 that supports techniques for configured beam-sweeping reception for NR sidelink in accordance with various aspects of the present disclosure. The device 2105 may be an example of or include the components of a device 1805, a device 1905, or a base station 105 as described herein. The device 2105 may communicate wirelessly with one or more base stations 105, UEs 115, or any combination thereof. The device 2105 may include components for bi-directional voice and data communications including components for transmitting and receiving communications, such as a communications manager 2120, a network communications manager 2110, a transceiver 2115, an antenna 2125, a memory 2130, code 2135, a processor 2140, and an inter-station communications manager 2145. These components may be in electronic communication or otherwise coupled (e.g., operatively, communicatively, functionally, electronically, electrically) via one or more buses (e.g., a bus 2150).

The network communications manager 2110 may manage communications with a core network 130 (e.g., via one or more wired backhaul links). For example, the network communications manager 2110 may manage the transfer of data communications for client devices, such as one or more UEs 115.

In some cases, the device 2105 may include a single antenna 2125. However, in some other cases the device 2105 may have more than one antenna 2125, which may be capable of concurrently transmitting or receiving multiple wireless transmissions. The transceiver 2115 may communicate bi-directionally, via the one or more antennas 2125, wired, or wireless links as described herein. For example, the transceiver 2115 may represent a wireless transceiver and may communicate bi-directionally with another wireless transceiver. The transceiver 2115 may also include a modem to modulate the packets, to provide the modulated packets to one or more antennas 2125 for transmission, and to demodulate packets received from the one or more antennas 2125.

The transceiver 2115, or the transceiver 2115 and one or more antennas 2125, may be an example of a transmitter 1815, a transmitter 1915, a receiver 1810, a receiver 1910, or any combination thereof or component thereof, as described herein.

The memory 2130 may include RAM and ROM. The memory 2130 may store computer-readable, computer-executable code 2135 including instructions that, when executed by the processor 2140, cause the device 2105 to perform various functions described herein. The code 2135 may be stored in a non-transitory computer-readable medium such as system memory or another type of memory. In some cases, the code 2135 may not be directly executable by the processor 2140 but may cause a computer (e.g., when compiled and executed) to perform functions described herein. In some cases, the memory 2130 may contain, among other things, a BIOS which may control basic hardware or software operation such as the interaction with peripheral components or devices.

The processor 2140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some other cases, a memory controller may be integrated into the processor 2140. The processor 2140 may be configured to execute computer-readable instructions stored in a memory (e.g., the memory 2130) to cause the device 2105 to perform various functions (e.g., functions or tasks supporting techniques for configured beam-sweeping reception for NR sidelink). For example, the device 2105 or a component of the device 2105 may include a processor 2140 and memory 2130 coupled to the processor 2140, the processor 2140 and memory 2130 configured to perform various functions described herein.

The inter-station communications manager 2145 may manage communications with other base stations 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communications network technology to provide communication between base stations 105.

The communications manager 2120 may support wireless communication at a base station in accordance with examples as disclosed herein. For example, the communications manager 2120 may be configured as or otherwise support a means for transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The communications manager 2120 may be configured as or otherwise support a means for transmitting, to the second UE, a grant for transmitting the SCI to the first UE over at least one of the set of multiple reception opportunities associated with a first reception occasion. The communications manager 2120 may be configured as or otherwise support a means for communicating with one or both of the first UE or the second UE based on transmitting the indication of the set of periodic reception occasions and the grant.

By including or configuring the communications manager 2120 in accordance with examples as described herein, the device 2105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 2120 may be configured to perform various operations (e.g., receiving, monitoring, transmitting) using or otherwise in cooperation with the transceiver 2115, the one or more antennas 2125, or any combination thereof. Although the communications manager 2120 is illustrated as a separate component, in some examples, one or more functions described with reference to the communications manager 2120 may be supported by or performed by the processor 2140, the memory 2130, the code 2135, or any combination thereof. For example, the code 2135 may include instructions executable by the processor 2140 to cause the device 2105 to perform various aspects of techniques for configured beam-sweeping reception for NR sidelink as described herein, or the processor 2140 and the memory 2130 may be otherwise configured to perform or support such operations.

Figure 22:
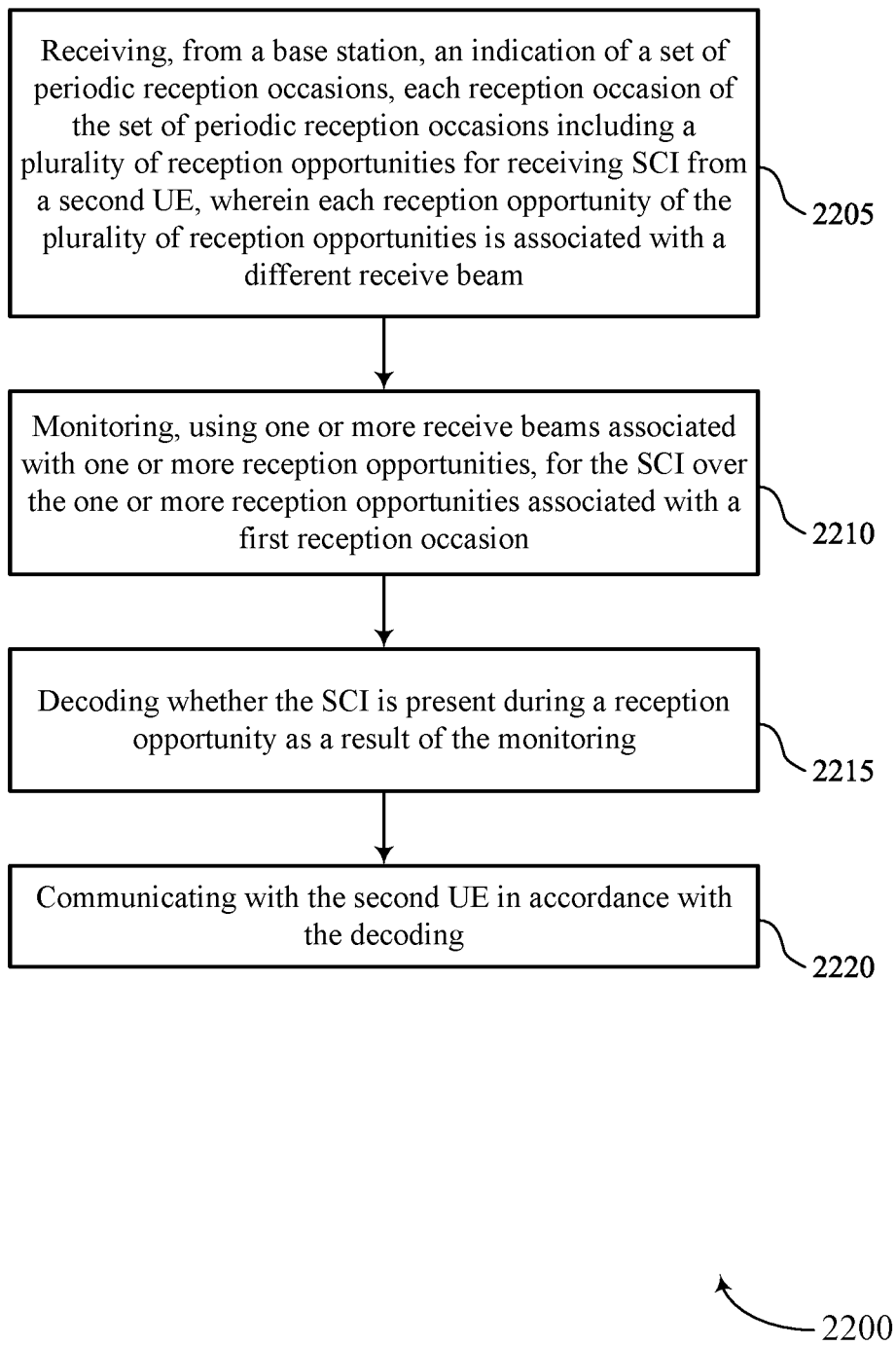
FIGS. 22 through 25 show flowcharts illustrating methods that support techniques for configured beam-sweeping reception for NR sidelink in accordance with various aspects of the present disclosure.

FIG. 22 shows a flowchart illustrating a method 2200 that supports techniques for configured beam-sweeping reception for NR sidelink in accordance with various aspects of the present disclosure. The operations of the method 2200 may be implemented by a UE or its components as described herein. For example, the operations of the method 2200 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The operations of 2205 may be performed in accordance with examples as disclosed herein. In some examples, aspects of the operations of 2205 may be performed by a reception occasion component 1625 as described with reference to FIG. 16.

At 2210, the method may include monitoring, using one or more receive beams associated with one or more reception opportunities, for the SCI over the one or more reception opportunities associated with a first reception occasion. The operations of 2210 may be performed in accordance with examples as disclosed herein. In some examples, aspects of the operations of 2210 may be performed by a monitoring component 1630 as described with reference to FIG. 16.

At 2215, the method may include decoding whether the SCI is present during a reception opportunity as a result of the monitoring. The operations of 2215 may be performed in accordance with examples as disclosed herein. In some examples, aspects of the operations of 2215 may be performed by a decoding component 1635 as described with reference to FIG. 16.

At 2220, the method may include communicating with the second UE in accordance with the decoding. The operations of 2220 may be performed in accordance with examples as disclosed herein. In some examples, aspects of the operations of 2220 may be performed by a communicating component 1640 as described with reference to FIG. 16.

Figure 23:
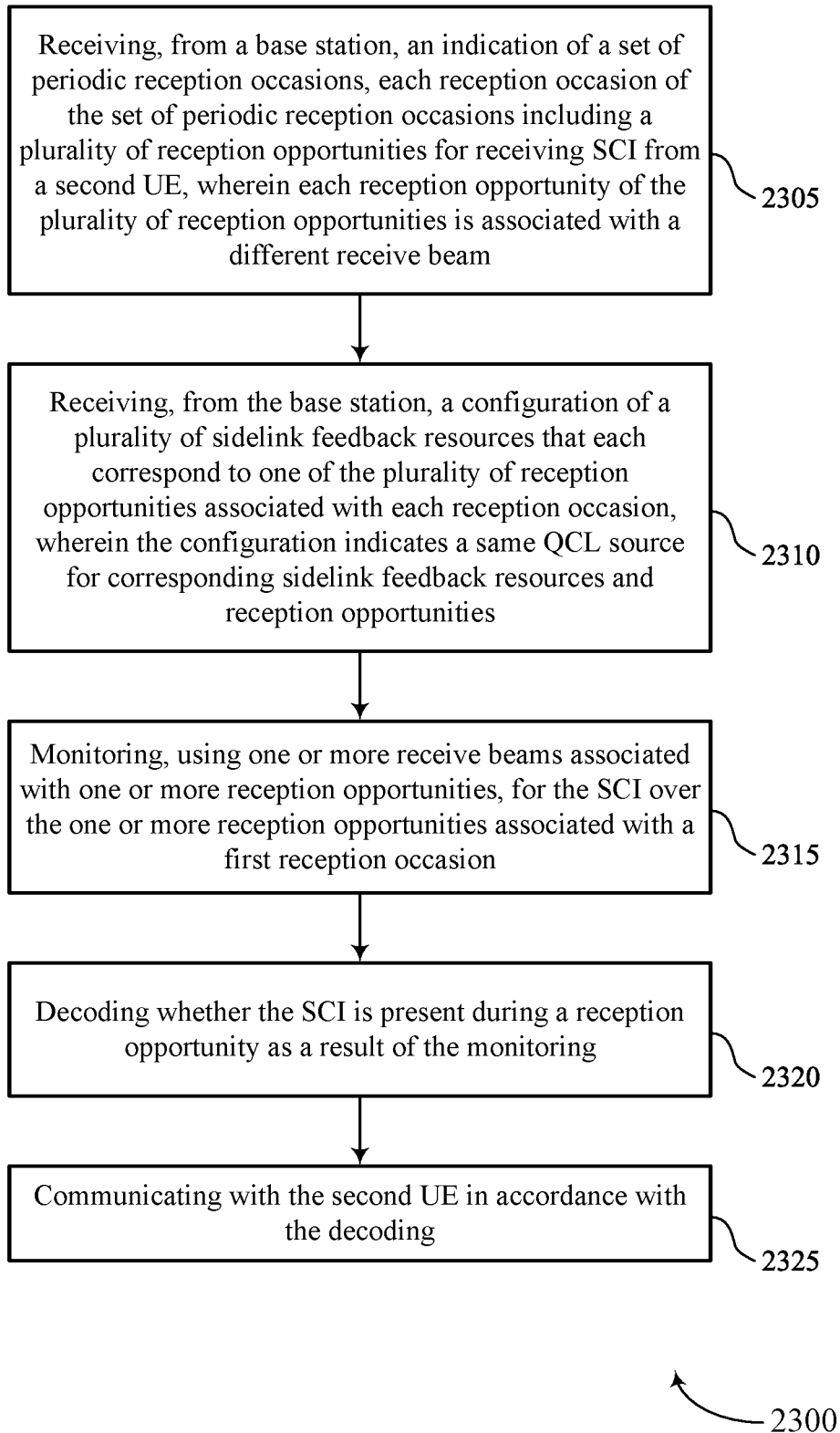

FIG. 23 shows a flowchart illustrating a method 2300 that supports techniques for configured beam-sweeping reception for NR sidelink in accordance with various aspects of the present disclosure. The operations of the method 2300 may be implemented by a UE or its components as described herein. For example, the operations of the method 2300 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The operations of 2305 may be performed in accordance with examples as disclosed herein.

In some examples, aspects of the operations of 2305 may be performed by a reception occasion component 1625 as described with reference to FIG. 16.

At 2310, the method may include receiving, from the base station, a configuration of a set of multiple sidelink feedback resources that each correspond to one of the set of multiple reception opportunities associated with each reception occasion, where the configuration indicates a same QCL source for corresponding sidelink feedback resources and reception opportunities. The operations of 2310 may be performed in accordance with examples as disclosed herein. In some examples, aspects of the operations of 2310 may be performed by a feedback component 1645 as described with reference to FIG. 16.

At 2315, the method may include monitoring, using one or more receive beams associated with one or more reception opportunities, for the SCI over the one or more reception opportunities associated with a first reception occasion. The operations of 2315 may be performed in accordance with examples as disclosed herein. In some examples, aspects of the operations of 2315 may be performed by a monitoring component 1630 as described with reference to FIG. 16.

At 2320, the method may include decoding whether the SCI is present during a reception opportunity as a result of the monitoring. The operations of 2320 may be performed in accordance with examples as disclosed herein. In some examples, aspects of the operations of 2320 may be performed by a decoding component 1635 as described with reference to FIG. 16.

At 2325, the method may include communicating with the second UE in accordance with the decoding. The operations of 2325 may be performed in accordance with examples as disclosed herein. In some examples, aspects of the operations of 2325 may be performed by a communicating component 1640 as described with reference to FIG. 16.

Figure 24:
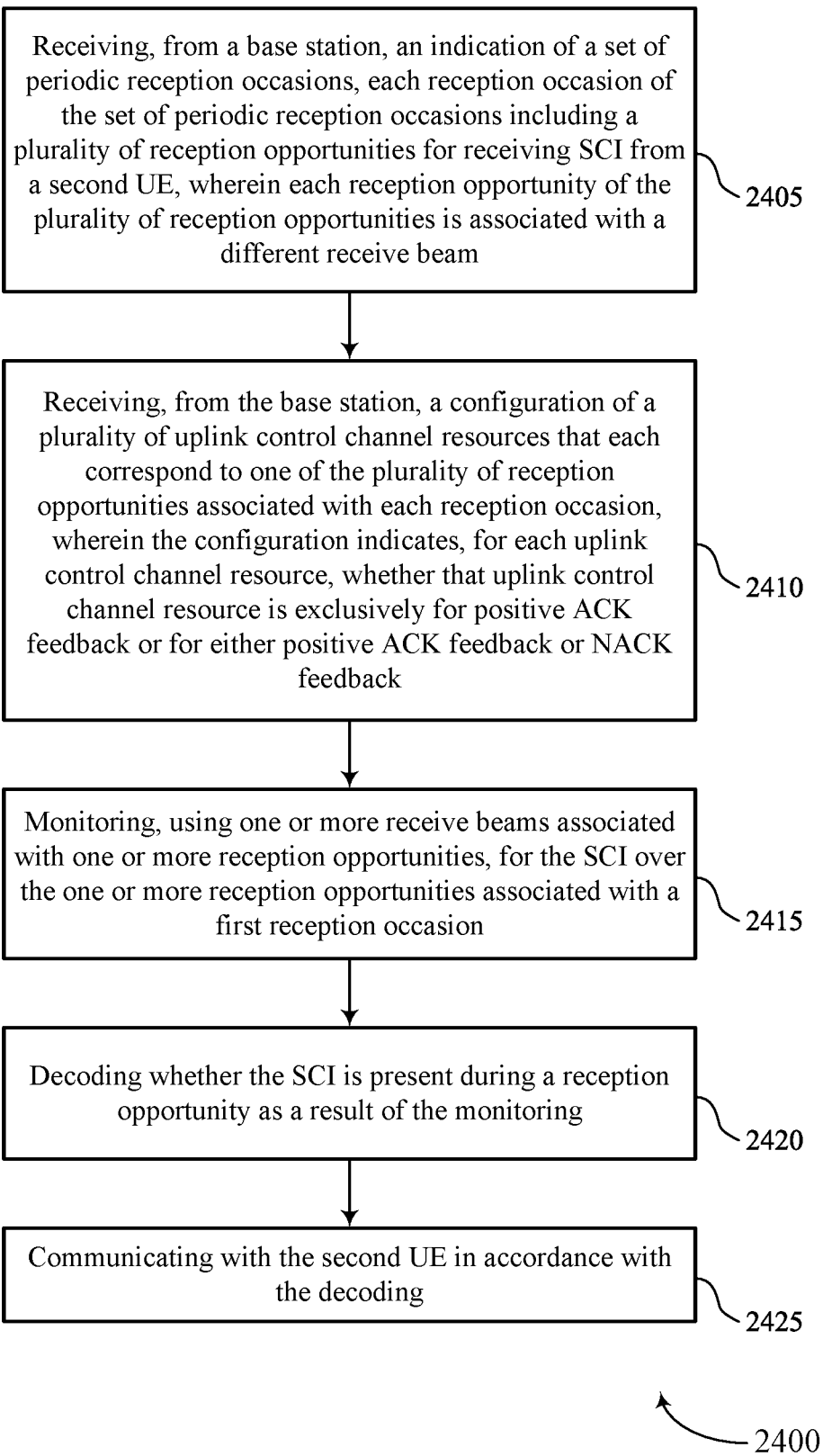

FIG. 24 shows a flowchart illustrating a method 2400 that supports techniques for configured beam-sweeping reception for NR sidelink in accordance with various aspects of the present disclosure. The operations of the method 2400 may be implemented by a UE or its components as described herein. For example, the operations of the method 2400 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2405, the method may include receiving, from a base station, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The operations of 2405 may be performed in accordance with examples as disclosed herein. In some examples, aspects of the operations of 2405 may be performed by a reception occasion component 1625 as described with reference to FIG. 16.

At 2410, the method may include receiving, from the base station, a configuration of a set of multiple uplink control channel resources that each correspond to one of the set of multiple reception opportunities associated with each reception occasion, where the configuration indicates, for each uplink control channel resource, whether that uplink control channel resource is exclusively for positive ACK feedback or for either positive ACK feedback or NACK feedback. The operations of 2410 may be performed in accordance with examples as disclosed herein. In some examples, aspects of the operations of 2410 may be performed by a feedback component 1645 as described with reference to FIG. 16.

At 2415, the method may include monitoring, using one or more receive beams associated with one or more reception opportunities, for the SCI over the one or more reception opportunities associated with a first reception occasion. The operations of 2415 may be performed in accordance with examples as disclosed herein. In some examples, aspects of the operations of 2415 may be performed by a monitoring component 1630 as described with reference to FIG. 16.

At 2420, the method may include decoding whether the SCI is present during a reception opportunity as a result of the monitoring. The operations of 2420 may be performed in accordance with examples as disclosed herein. In some examples, aspects of the operations of 2420 may be performed by a decoding component 1635 as described with reference to FIG. 16.

At 2425, the method may include communicating with the second UE in accordance with the decoding. The operations of 2425 may be performed in accordance with examples as disclosed herein. In some examples, aspects of the operations of 2425 may be performed by a communicating component 1640 as described with reference to FIG. 16.

Figure 25:
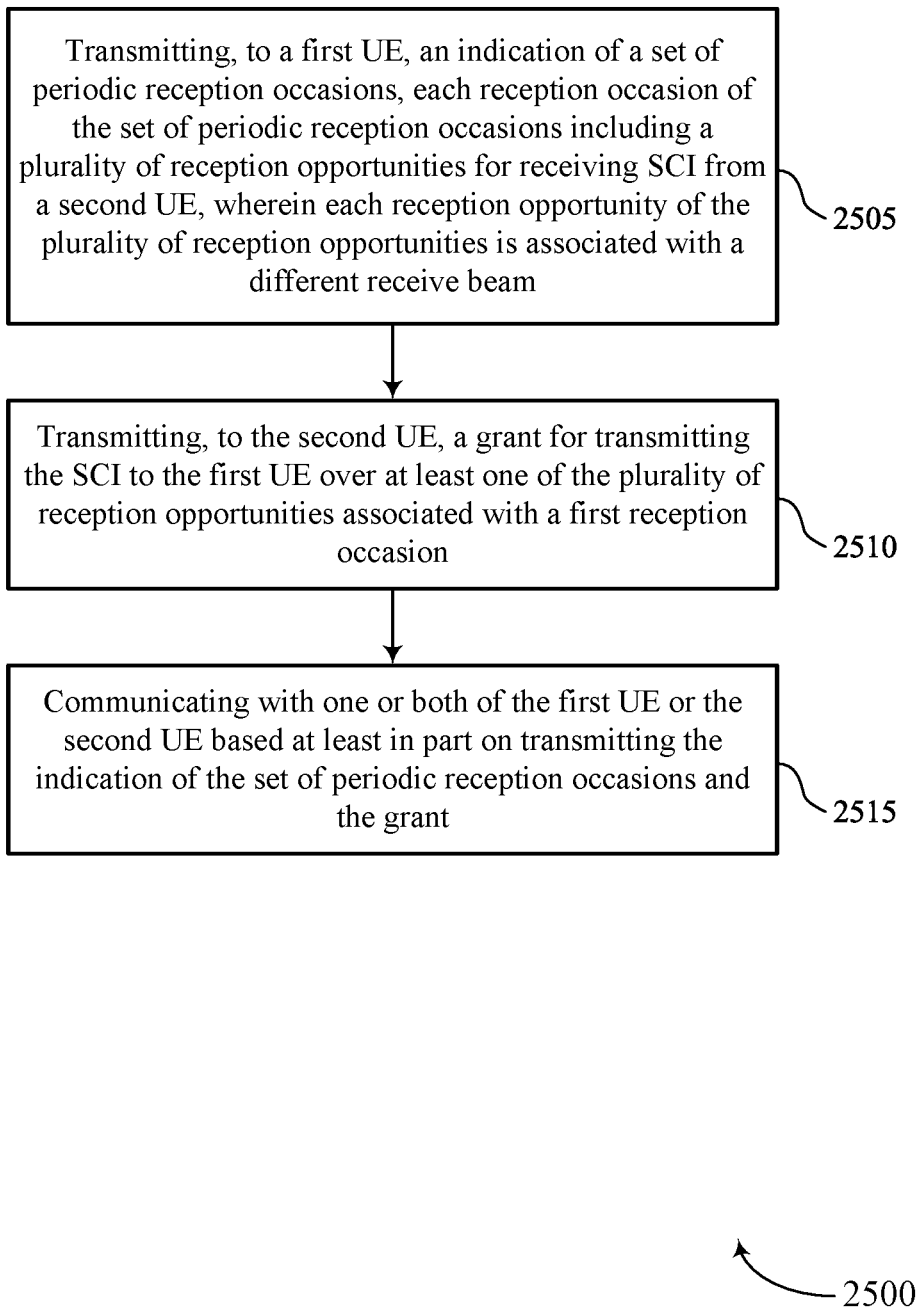

FIG. 25 shows a flowchart illustrating a method 2500 that supports techniques for configured beam-sweeping reception for NR sidelink in accordance with various aspects of the present disclosure. The operations of the method 2500 may be implemented by a base station or its components as described herein. For example, the operations of the method 2500 may be performed by a base station 105 as described with reference to FIGS. 1 through 13 and 18 through 21. In some examples, a base station may execute a set of instructions to control the functional elements of the base station to perform the described functions. Additionally or alternatively, the base station may perform aspects of the described functions using special-purpose hardware.

At 2505, the method may include transmitting, to a first UE, an indication of a set of periodic reception occasions, each reception occasion of the set of periodic reception occasions including a set of multiple reception opportunities for receiving SCI from a second UE, where each reception opportunity of the set of multiple reception opportunities is associated with a different receive beam. The operations of 2505 may be performed in accordance with examples as disclosed herein. In some examples, aspects of the operations of 2505 may be performed by a reception occasion component 2025 as described with reference to FIG. 20.

At 2510, the method may include transmitting, to the second UE, a grant for transmitting the SCI to the first UE over at least one of the set of multiple reception opportunities associated with a first reception occasion. The operations of 2510 may be performed in accordance with examples as disclosed herein. In some examples, aspects of the operations of 2510 may be performed by a resource grant component 2030 as described with reference to FIG. 20.

At 2515, the method may include communicating with one or both of the first UE or the second UE based on transmitting the indication of the set of periodic reception occasions and the grant. The operations of 2515 may be performed in accordance with examples as disclosed herein. In some examples, aspects of the operations of 2515 may be performed by a communicating component 2035 as described with reference to FIG. 20.

The following provides an overview of aspects of the present disclosure:

Aspect 1: A method for wireless communication at first UE, comprising: receiving, from a base station, an indication of a set of periodic reception occasions, each reception occasion of the set of periodic reception occasions including a plurality of reception opportunities for receiving SCI from a second UE, wherein each reception opportunity of the plurality of reception opportunities is associated with a different receive beam; monitoring, using one or more receive beams associated with one or more reception opportunities, for the SCI over the one or more reception opportunities associated with a first reception occasion; decoding whether the SCI is present during a reception opportunity as a result of the monitoring; and communicating with the second UE in accordance with the decoding.

Aspect 2: The method of aspect 1, further comprising: receiving, from the base station, a configuration of a plurality of sidelink feedback resources that each correspond to one of the plurality of reception opportunities associated with each reception occasion, wherein the configuration indicates a same QCL source for corresponding sidelink feedback resources and reception opportunities.

Aspect 3: The method of aspect 2, wherein communicating with the second UE in accordance with the decoding comprises: transmitting, to the second UE using a first directional beam, feedback over a first sidelink feedback resource corresponding to the reception opportunity based at least in part on decoding whether the SCI is present during the reception opportunity, wherein the reception opportunity and the first sidelink feedback resource are both associated with a same first QCL source corresponding to the first directional beam in accordance with the configuration.

Aspect 4: The method of any of aspects 1 through 3, further comprising: receiving, from the base station, a configuration of a plurality of uplink control channel resources that each correspond to one of the plurality of reception opportunities associated with each reception occasion, wherein the configuration indicates, for each uplink control channel resource, whether that uplink control channel resource is exclusively for positive ACK feedback or for either positive ACK feedback or NACK feedback.

Aspect 5: The method of aspect 4, wherein the configuration indicates that each uplink control channel resource is exclusively for positive ACK feedback.

Aspect 6: The method of aspect 4, wherein the configuration indicates that a first subset of uplink control channel resources within each reception occasion are exclusively for positive ACK feedback and that a final uplink control channel resource within each reception occasion is for either positive ACK feedback or NACK feedback.

Aspect 7: The method of aspect 4, wherein the configuration indicates a supplemental uplink control channel resource for each reception occasion in addition to the plurality of uplink control channel resources that each correspond to one of the plurality of reception opportunities included within each reception occasion; and that each uplink control channel resource of the plurality of uplink control channel resources is exclusively for positive ACK feedback and that the supplemental uplink control channel resource is for either positive ACK feedback or NACK feedback.

Aspect 8: The method of any of aspects 1 through 7, further comprising: receiving, from the second UE, the SCI over a first reception opportunity associated with the first reception occasion, wherein the SCI indicates sidelink shared channel resource reservations for a remainder of the plurality of reception opportunities associated with the first reception occasion.

Aspect 9: The method of any of aspects 1 through 8, further comprising: receiving, from the second UE, the SCI and sidelink data in a first reception opportunity associated with the first reception occasion, wherein the SCI indicates a sidelink shared channel resource reservation for a retransmission of the sidelink data, the sidelink shared channel resource reservation outside of the first reception occasion.

Aspect 10: The method of any of aspects 1 through 9, wherein monitoring for the SCI comprises: monitoring for the SCI over a first reception opportunity during a first time period using a first receive beam; and switching to monitoring for the SCI over a second reception opportunity during a second time period using a second receive beam after the first time period based at least in part on failing to decode the SCI or corresponding sidelink data over the first reception opportunity.

Aspect 11: The method of any of aspects 1 through 9, wherein the first reception occasion comprises a first reception opportunity and a second reception opportunity, and wherein monitoring for the SCI comprises: monitoring for the SCI over the first reception opportunity during a first time period using a first receive beam; and refraining from monitoring for the SCI over the second reception opportunity based at least in part on successfully decoding the SCI and corresponding sidelink data over the first reception opportunity.

Aspect 12: The method of any of aspects 1 through 11, wherein each reception opportunity of the plurality of reception opportunities comprises a different set of time and frequency resources.

Aspect 13: A method for wireless communication at a base station, comprising: transmitting, to a first UE, an indication of a set of periodic reception occasions, each reception occasion of the set of periodic reception occasions including a plurality of reception opportunities for receiving SCI from a second UE, wherein each reception opportunity of the plurality of reception opportunities is associated with a different receive beam; transmitting, to the second UE, a grant for transmitting the SCI to the first UE over at least one of the plurality of reception opportunities associated with a first reception occasion; and communicating with one or both of the first UE or the second UE based at least in part on transmitting the indication of the set of periodic reception occasions and the grant.

Aspect 14: The method of aspect 13, further comprising: transmitting, to the first UE, a configuration of a plurality of sidelink feedback resources that each correspond to one of the plurality of reception opportunities associated with each reception occasion, wherein the configuration indicates a same QCL source for corresponding sidelink feedback resources and reception opportunities.

Aspect 15: The method of any of aspects 13 or 14, further comprising: transmitting, to the first UE, a configuration of a plurality of uplink control channel resources that each correspond to one of the plurality of reception opportunities associated with each reception occasion, wherein the configuration indicates, for each uplink control channel resource, whether that uplink control channel resource is exclusively for positive ACK feedback or for either positive ACK feedback or NACK feedback.

Aspect 16: The method of aspect 15, wherein the configuration indicates that each uplink control channel resource is exclusively for positive ACK feedback.

Aspect 17: The method of aspect 15, wherein the configuration indicates that a first subset of uplink control channel resources within each reception occasion are exclusively for positive ACK feedback and that a final uplink control channel resource within each reception occasion is for either positive ACK feedback or NACK feedback.

Aspect 18: The method of aspect 15, wherein the configuration indicates a supplemental uplink control channel resource for each reception occasion in addition to the plurality of uplink control channel resources that each correspond to one of the plurality of reception opportunities included within each reception occasion; and that each uplink control channel resource of the plurality of uplink control channel resources is exclusively for positive ACK feedback and that the supplemental uplink control channel resource is for either positive ACK feedback or NACK feedback.

Aspect 19: The method of any of aspects 13 through 18, wherein transmitting the grant to the second UE comprises: transmitting a single grant scheduling the second UE to transmit the SCI over a first reception opportunity associated with the first reception occasion, wherein the SCI indicates sidelink shared channel resource reservations for a remainder of the plurality of reception opportunities associated with the first reception occasion.

Aspect 20: The method of any of aspects 13 through 18, wherein transmitting the grant to the second UE comprises: transmitting a plurality grants scheduling the second UE to transmit the SCI and sidelink data over the plurality of reception opportunities associated with the first reception occasion, wherein the SCI indicates a sidelink shared channel resource reservation for a re-transmission of the sidelink data, the sidelink shared channel resource reservation outside of the first reception occasion.

Aspect 21: The method of any of aspects 13 through 20, further comprising: re-scheduling a resource associated with a reception opportunity for sidelink communication to a third UE, wherein the third UE has a different identifier than the first UE.

Aspect 22: The method of any of aspects 13 through 21, further comprising: re-scheduling a resource associated with a reception opportunity for sidelink communication to a third UE, wherein the sidelink communication includes second SCI for the third UE, the second SCI associated with a lower-indexed sub-channel than the resource associated with the reception opportunity.

Aspect 23: The method of any of aspects 13 through 22, wherein each reception opportunity of the plurality of reception opportunities comprises a different set of time and frequency resources.

Aspect 24: An apparatus for wireless communication at first UE, comprising a processor; memory coupled with the processor; and instructions stored in the memory and executable by the processor to cause the apparatus to perform a method of any of aspects 1 through 12.

Aspect 25: An apparatus for wireless communication at first UE, comprising at least one means for performing a method of any of aspects 1 through 12.

Aspect 26: A non-transitory computer-readable medium storing code for wireless communication at first UE, the code comprising instructions executable by a processor to perform a method of any of aspects 1 through 12.

Aspect 27: An apparatus for wireless communication at a base station, comprising a processor; memory coupled with the processor; and instructions stored in the memory and executable by the processor to cause the apparatus to perform a method of any of aspects 13 through 23.

Aspect 28: An apparatus for wireless communication at a base station, comprising at least one means for performing a method of any of aspects 13 through 23.

Aspect 29: A non-transitory computer-readable medium storing code for wireless communication at a base station, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at first user equipment (UE), comprising:

receiving, from a base station, an indication of a set of periodic reception occasions, each reception occasion of the set of periodic reception occasions including a plurality of reception opportunities for receiving sidelink control information from a second UE, wherein each reception opportunity of the plurality of reception opportunities is associated with a different receive beam;

monitoring, using one or more receive beams associated with one or more reception opportunities, for the sidelink control information over the one or more reception opportunities associated with a first reception occasion;

decoding whether the sidelink control information is present during a reception opportunity as a result of the monitoring; and communicating with the second UE in accordance with the decoding.

2. The method of claim 1, further comprising:

receiving, from the base station, a configuration of a plurality of sidelink feedback resources that each correspond to one of the plurality of reception opportunities associated with each reception occasion, wherein the configuration indicates a same quasi-colocation source for corresponding sidelink feedback resources and reception opportunities.

3. The method of claim 2, wherein communicating with the second UE in accordance with the decoding comprises:
transmitting, to the second UE using a first directional beam, feedback over a first sidelink feedback resource corresponding to the reception opportunity based at least in part on decoding whether the sidelink control information is present during the reception opportunity, wherein the reception opportunity and the first sidelink feedback resource are both associated with a same first quasi-colocation source corresponding to the first directional beam in accordance with the configuration.

4. The method of claim 1, further comprising:
receiving, from the base station, a configuration of a plurality of uplink control channel resources that each correspond to one of the plurality of reception opportunities associated with each reception occasion, wherein the configuration indicates, for each uplink control channel resource, whether that uplink control channel resource is exclusively for positive acknowledgement feedback or for either positive acknowledgement feedback or negative acknowledgement feedback.

5. The method of claim 4, wherein the configuration indicates that each uplink control channel resource is exclusively for positive acknowledgement feedback.

6. The method of claim 4, wherein the configuration indicates that a first subset of uplink control channel resources within each reception occasion are exclusively for positive acknowledgement feedback and that a final uplink control channel resource within each reception occasion is for either positive acknowledgement feedback or negative acknowledgement feedback.

7. The method of claim 4, wherein the configuration indicates:
a supplemental uplink control channel resource for each reception occasion in addition to the plurality of uplink control channel resources that each correspond to one of the plurality of reception opportunities included within each reception occasion; and
that each uplink control channel resource of the plurality of uplink control channel resources is exclusively for positive acknowledgement feedback and that the supplemental uplink control channel resource is for either positive acknowledgement feedback or negative acknowledgement feedback.

8. The method of claim 1, further comprising:
receiving, from the second UE, the sidelink control information over a first reception opportunity associated with the first reception occasion, wherein the sidelink control information indicates sidelink shared channel resource reservations for a remainder of the plurality of reception opportunities associated with the first reception occasion.

9. The method of claim 1, further comprising:
receiving, from the second UE, the sidelink control information and sidelink data in a first reception opportunity associated with the first reception occasion, wherein the sidelink control information indicates a sidelink shared channel resource reservation for a re-transmission of the sidelink data, the sidelink shared channel resource reservation outside of the first reception occasion.

10. The method of claim 1, wherein monitoring for the sidelink control information comprises:
monitoring for the sidelink control information over a first reception opportunity during a first time period using a first receive beam; and
switching to monitoring for the sidelink control information over a second reception opportunity during a second time period using a second receive beam after the first time period based at least in part on failing to decode the sidelink control information or corresponding sidelink data over the first reception opportunity.

11. The method of claim 1, wherein the first reception occasion comprises a first reception opportunity and a second reception opportunity, and wherein monitoring for the sidelink control information comprises:
monitoring for the sidelink control information over the first reception opportunity during a first time period using a first receive beam; and
refraining from monitoring for the sidelink control information over the second reception opportunity based at least in part on successfully decoding the sidelink control information and corresponding sidelink data over the first reception opportunity.

12. The method of claim 1, wherein each reception opportunity of the plurality of reception opportunities comprises a different set of time and frequency resources.

13. A method for wireless communication at a base station, comprising:
transmitting, to a first user equipment (UE), an indication of a set of periodic reception occasions, each reception occasion of the set of periodic reception occasions including a plurality of reception opportunities for receiving sidelink control information from a second UE, wherein each reception opportunity of the plurality of reception opportunities is associated with a different receive beam;
transmitting, to the second UE, a grant for transmitting the sidelink control information to the first UE over at least one of the plurality of reception opportunities associated with a first reception occasion; and
communicating with one or both of the first UE or the second UE based at least in part on transmitting the indication of the set of periodic reception occasions and the grant.

14. The method of claim 13, further comprising:
transmitting, to the first UE, a configuration of a plurality of sidelink feedback resources that each correspond to one of the plurality of reception opportunities associated with each reception occasion, wherein the configuration indicates a same quasi-colocation source for corresponding sidelink feedback resources and reception opportunities.

15. The method of claim 13, further comprising:
transmitting, to the first UE, a configuration of a plurality of uplink control channel resources that each correspond to one of the plurality of reception opportunities associated with each reception occasion, wherein the configuration indicates, for each uplink control channel resource, whether that uplink control channel resource is exclusively for positive acknowledgement feedback or for either positive acknowledgement feedback or negative acknowledgement feedback.

16. The method of claim 15, wherein the configuration indicates that each uplink control channel resource is exclusively for positive acknowledgement feedback.

17. The method of claim 15, wherein the configuration indicates that a first subset of uplink control channel resources within each reception occasion are exclusively for positive acknowledgement feedback and that a final uplink control channel resource within each reception occasion is for either positive acknowledgement feedback or negative acknowledgement feedback.

18. The method of claim 15, wherein the configuration indicates:
 a supplemental uplink control channel resource for each reception occasion in addition to the plurality of uplink control channel resources that each correspond to one of the plurality of reception opportunities included within each reception occasion; and
 that each uplink control channel resource of the plurality of uplink control channel resources is exclusively for positive acknowledgement feedback and that the supplemental uplink control channel resource is for either positive acknowledgement feedback or negative acknowledgement feedback.

19. The method of claim 13, wherein transmitting the grant to the second UE comprises:
 transmitting a single grant scheduling the second UE to transmit the sidelink control information over a first reception opportunity associated with the first reception occasion, wherein the sidelink control information indicates sidelink shared channel resource reservations for a remainder of the plurality of reception opportunities associated with the first reception occasion.

20. The method of claim 13, wherein transmitting the grant to the second UE comprises:
 transmitting a plurality grants scheduling the second UE to transmit the sidelink control information and sidelink data over the plurality of reception opportunities associated with the first reception occasion, wherein the sidelink control information indicates a sidelink shared channel resource reservation for a re-transmission of the sidelink data, the sidelink shared channel resource reservation outside of the first reception occasion.

21. The method of claim 13, further comprising:
 re-scheduling a resource associated with a reception opportunity for sidelink communication to a third UE, wherein the third UE has a different identifier than the first UE.

22. The method of claim 13, further comprising:
 re-scheduling a resource associated with a reception opportunity for sidelink communication to a third UE, wherein the sidelink communication includes second sidelink control information for the third UE, the second sidelink control information associated with a lower-indexed sub-channel than the resource associated with the reception opportunity.

23. The method of claim 13, wherein each reception opportunity of the plurality of reception opportunities comprises a different set of time and frequency resources.

24. An apparatus for wireless communication at first user equipment (UE), comprising:
 a processor;
 memory coupled with the processor; and
 instructions stored in the memory and executable by the processor to cause the apparatus to:
  receive, from a base station, an indication of a set of periodic reception occasions, each reception occasion of the set of periodic reception occasions including a plurality of reception opportunities for receiving sidelink control information from a second UE, wherein each reception opportunity of the plurality of reception opportunities is associated with a different receive beam;
  monitor, using one or more receive beams associated with one or more reception opportunities, for the sidelink control information over the one or more reception opportunities associated with a first reception occasion;
  decode whether the sidelink control information is present during a reception opportunity as a result of the monitoring; and
  communicate with the second UE in accordance with the decoding.

25. The apparatus of claim 24, wherein the instructions are further executable by the processor to cause the apparatus to:
 receive, from the base station, a configuration of a plurality of sidelink feedback resources that each correspond to one of the plurality of reception opportunities associated with each reception occasion, wherein the configuration indicates a same quasi-colocation source for corresponding sidelink feedback resources and reception opportunities.

26. The apparatus of claim 24, wherein the instructions are further executable by the processor to cause the apparatus to:
 receive, from the base station, a configuration of a plurality of uplink control channel resources that each correspond to one of the plurality of reception opportunities associated with each reception occasion, wherein the configuration indicates, for each uplink control channel resource, whether that uplink control channel resource is exclusively for positive acknowledgement feedback or for either positive acknowledgement feedback or negative acknowledgement feedback.

27. The apparatus of claim 24, wherein the instructions are further executable by the processor to cause the apparatus to:
 receive, from the second UE, the sidelink control information over a first reception opportunity associated with the first reception occasion, wherein the sidelink control information indicates sidelink shared channel resource reservations for a remainder of the plurality of reception opportunities associated with the first reception occasion.

28. The apparatus of claim 24, wherein the instructions are further executable by the processor to cause the apparatus to:
 receive, from the second UE, the sidelink control information and sidelink data in a first reception opportunity associated with the first reception occasion, wherein the sidelink control information indicates a sidelink shared channel resource reservation for a re-transmission of the sidelink data, the sidelink shared channel resource reservation outside of the first reception occasion.

29. The apparatus of claim 24, wherein the instructions to monitor for the sidelink control information are executable by the processor to cause the apparatus to:
 monitor for the sidelink control information over a first reception opportunity during a first time period using a first receive beam; and
 switch to monitoring for the sidelink control information over a second reception opportunity during a second time period using a second receive beam after the first time period based at least in part on failing to decode the sidelink control information or corresponding sidelink data over the first reception opportunity.

30. An apparatus for wireless communication at a base station, comprising:
- a processor;
- memory coupled with the processor; and
- instructions stored in the memory and executable by the processor to cause the apparatus to:
  - transmit, to a first user equipment (UE), an indication of a set of periodic reception occasions, each reception occasion of the set of periodic reception occasions including a plurality of reception opportunities for receiving sidelink control information from a second UE, wherein each reception opportunity of the plurality of reception opportunities is associated with a different receive beam;
  - transmit, to the second UE, a grant for transmitting the sidelink control information to the first UE over at least one of the plurality of reception opportunities associated with a first reception occasion; and
  - communicate with one or both of the first UE or the second UE based at least in part on transmitting the indication of the set of periodic reception occasions and the grant.

* * * * *